(12) United States Patent
Sloan et al.

(10) Patent No.: US 10,864,859 B2
(45) Date of Patent: Dec. 15, 2020

(54) TAILGATE FUEL STORAGE SYSTEM

(71) Applicant: Agility Fuel Systems LLC, Costa Mesa, CA (US)

(72) Inventors: Todd Sloan, Kelowna (CA); Chris Forsberg, Kelowna (CA)

(73) Assignee: Agility Fuel Systems LLC, Costa Mesa, CA (US)

(*) Notice: Subject to any disclaimer, the term of this patent is extended or adjusted under 35 U.S.C. 154(b) by 0 days.

(21) Appl. No.: 15/886,773

(22) Filed: Feb. 1, 2018

(65) Prior Publication Data

US 2018/0257580 A1 Sep. 13, 2018

Related U.S. Application Data

(60) Provisional application No. 62/453,442, filed on Feb. 1, 2017, provisional application No. 62/492,798, filed on May 1, 2017.

(51) Int. Cl.
*B60R 9/06* (2006.01)
*B60K 15/03* (2006.01)
(Continued)

(52) U.S. Cl.
CPC .......... *B60R 9/06* (2013.01); *B60K 15/03006* (2013.01); *B60K 15/063* (2013.01); *B60K 15/067* (2013.01); *B60K 15/07* (2013.01); *B62D 33/023* (2013.01); *B60K 2015/03118* (2013.01); *B60K 2015/0638* (2013.01)

(58) Field of Classification Search
CPC ............ B60K 15/03006; B60K 15/063; B60K 15/067; B60K 15/07; B60K 2015/0638; B60R 9/06
See application file for complete search history.

(56) References Cited

U.S. PATENT DOCUMENTS

| 1,598,868 A | 9/1926 | Frederick |
| 3,134,603 A | 5/1964 | Rogers |

(Continued)

FOREIGN PATENT DOCUMENTS

| EP | 2130747 A2 | 12/2009 |
| EP | 2165875 A2 | 3/2010 |

(Continued)

OTHER PUBLICATIONS

PCT/US2018/016520 International Search Report and Written Opinion dated Apr. 25, 2018.

(Continued)

*Primary Examiner* — Derek J Battisti
(74) *Attorney, Agent, or Firm* — Knobbe, Martens, Olson & Bear, LLP

(57) ABSTRACT

Methods and systems for fuel storage and transportation are provided. A support assembly for supporting a plurality of fuel containers may comprise a plurality of end support members, and a plurality of side support members that are detachably coupled to the plurality of end support members. The plurality of fuel containers may be configured to be located on a plurality of different planes when supported by the support assembly, in a manner that permits the support assembly to accommodate a plurality of tailgates of different shapes and/or dimensions.

23 Claims, 14 Drawing Sheets

(51) Int. Cl.
  *B60K 15/07* (2006.01)
  *B60K 15/067* (2006.01)
  *B60K 15/063* (2006.01)
  *B62D 33/023* (2006.01)

(56) References Cited

U.S. PATENT DOCUMENTS

| | | |
|---|---|---|
| 3,294,225 A | 12/1966 | Kenyon |
| 4,289,730 A | 9/1981 | Tomlinson |
| 4,309,947 A | 1/1982 | Ketterer |
| 4,542,734 A | 9/1985 | Trent et al. |
| 4,543,892 A | 10/1985 | Tomlinson et al. |
| 4,616,994 A | 10/1986 | Tomlinson |
| 4,682,579 A | 7/1987 | Bigham |
| 4,865,517 A | 9/1989 | Beehler |
| 5,136,752 A | 8/1992 | Bening et al. |
| 5,527,098 A | 6/1996 | McKinney |
| 5,658,117 A | 8/1997 | McKinney et al. |
| 5,787,920 A | 8/1998 | Krasnov |
| 5,871,330 A | 2/1999 | Davenport |
| 6,053,533 A | 4/2000 | Osborn et al. |
| 6,174,126 B1 | 1/2001 | Zanzig et al. |
| 6,183,185 B1 | 2/2001 | Zanzig et al. |
| 6,347,678 B1 | 2/2002 | Osborn et al. |
| 6,402,198 B2 | 6/2002 | Gollungberg |
| 6,481,751 B1 | 11/2002 | Davis, Jr. et al. |
| 6,485,244 B1 | 11/2002 | McKinney |
| 6,595,569 B1 | 7/2003 | McKinney |
| 6,733,027 B2 | 5/2004 | Stragier et al. |
| 6,843,237 B2 | 1/2005 | Bowen et al. |
| 6,896,318 B2 | 5/2005 | Marrs et al. |
| 6,907,666 B2 | 6/2005 | Mills |
| 6,955,520 B2 | 10/2005 | Flerchinger et al. |
| 7,137,474 B2 | 11/2006 | Yokote |
| 7,189,040 B2 | 3/2007 | Sharp |
| 7,270,209 B2 | 9/2007 | Suess |
| 7,976,067 B2 | 7/2011 | Naganuma et al. |
| 7,984,925 B2 | 7/2011 | Levin et al. |
| 8,381,955 B2 | 2/2013 | Grater et al. |
| 8,686,210 B2 | 4/2014 | Heil et al. |
| 8,690,191 B2 | 4/2014 | Gentry |
| 8,905,170 B2 | 12/2014 | Kyoden et al. |
| 9,061,584 B2 | 6/2015 | Vargo et al. |
| 9,120,372 B2 | 9/2015 | Sloan et al. |
| 9,227,582 B2 | 1/2016 | Katayama et al. |
| 9,315,100 B2 | 4/2016 | Gentry |
| 9,428,334 B2 | 8/2016 | Whitfield, Jr. et al. |
| 9,457,652 B2 | 10/2016 | Sloan et al. |
| 9,533,569 B2 | 1/2017 | McKinney et al. |
| 10,017,037 B2 | 6/2018 | Newman et al. |
| 10,144,280 B2 | 12/2018 | Sloan et al. |
| 10,369,884 B2 | 8/2019 | Sloan et al. |
| 2001/0001637 A1 | 5/2001 | Zanzig et al. |
| 2003/0234511 A1 | 12/2003 | Stragier et al. |
| 2004/0091345 A1 | 5/2004 | Flerchinger et al. |
| 2004/0117965 A1 | 6/2004 | Mills |
| 2005/0019147 A1 | 1/2005 | Flerchinger et al. |
| 2007/0119646 A1* | 5/2007 | Minami ............... B60K 15/067 180/271 |
| 2008/0098562 A1 | 5/2008 | Tagliaferri |
| 2009/0114784 A1 | 5/2009 | Tam |
| 2010/0252353 A1 | 10/2010 | Tsubokawa |
| 2011/0233353 A1 | 9/2011 | Palmer |
| 2011/0237854 A1 | 9/2011 | Heil et al. |
| 2011/0288738 A1 | 11/2011 | Donnelly et al. |
| 2012/0228307 A1* | 9/2012 | Simmons ............... B60K 15/07 220/562 |
| 2012/0280481 A1 | 11/2012 | Gentry |
| 2013/0001384 A1 | 1/2013 | Karlsson et al. |
| 2013/0084152 A1 | 4/2013 | Duell |
| 2013/0199863 A1* | 8/2013 | Robbins ............... B60K 15/063 180/69.4 |
| 2013/0334381 A1 | 12/2013 | Vargo, Jr. et al. |
| 2014/0061266 A1 | 3/2014 | Milton et al. |
| 2014/0137953 A1 | 5/2014 | Gibb et al. |
| 2014/0175782 A1 | 6/2014 | Sloan et al. |
| 2014/0175783 A1 | 6/2014 | Sloan et al. |
| 2014/0199143 A1 | 7/2014 | Gentry |
| 2014/0343801 A1 | 11/2014 | Whitfield, Jr. et al. |
| 2014/0367954 A1* | 12/2014 | McKinney ............... B65F 3/00 280/834 |
| 2015/0108747 A1 | 4/2015 | Goedken |
| 2015/0129338 A1 | 5/2015 | Green et al. |
| 2015/0175353 A1 | 6/2015 | Gillmore et al. |
| 2015/0367727 A1 | 12/2015 | Sloan et al. |
| 2016/0023548 A1* | 1/2016 | Crist ............... B60K 15/03006 180/271 |
| 2016/0355335 A1 | 12/2016 | Whitfield, Jr. et al. |
| 2017/0334288 A1 | 1/2017 | Rike et al. |
| 2017/0072791 A1 | 3/2017 | Sloan et al. |
| 2017/0080798 A1* | 3/2017 | Van Der Linden .... B60K 15/07 |
| 2017/0106746 A1 | 4/2017 | McKinney |
| 2018/0111477 A1* | 4/2018 | Sloan ............... B65F 3/24 |
| 2018/0283610 A1 | 10/2018 | Wexler et al. |
| 2019/0084415 A1 | 3/2019 | Sloan et al. |

FOREIGN PATENT DOCUMENTS

| | | |
|---|---|---|
| JP | H11-278069 A | 10/1999 |
| JP | 2005-138771 A | 6/2005 |
| JP | 2009-220680 A | 10/2009 |
| JP | 2010-100207 A | 5/2010 |
| WO | WO-0112532 A1 | 2/2001 |
| WO | WO-03046433 A1 | 6/2003 |
| WO | WO-2004000604 A2 | 12/2003 |
| WO | WO-2004058557 A2 | 7/2004 |
| WO | WO-2005009783 A2 | 2/2005 |
| WO | WO 2007/133213 A1 | 11/2007 |
| WO | WO-2010037756 A2 | 4/2010 |
| WO | WO-2010037756 A3 | 11/2010 |
| WO | WO 2012/115622 A1 | 8/2012 |
| WO | WO 2016/210329 | 12/2016 |
| WO | WO-2018144780 A1 | 8/2018 |

OTHER PUBLICATIONS

European Search Report issued in European Application No. 16815425.0, dated Mar. 14, 2019, in 4 pages.
International Search Report and Written Opinion issued in PCT Application No. PCT/US2016/039363, dated Sep. 16, 2016, in 15 pages.

* cited by examiner

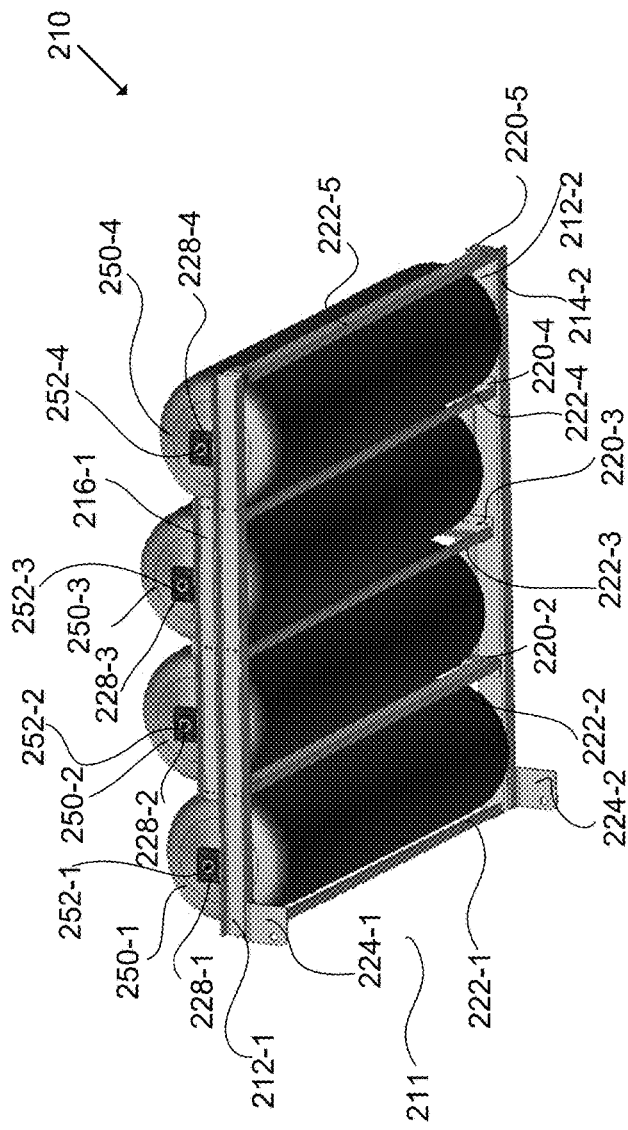
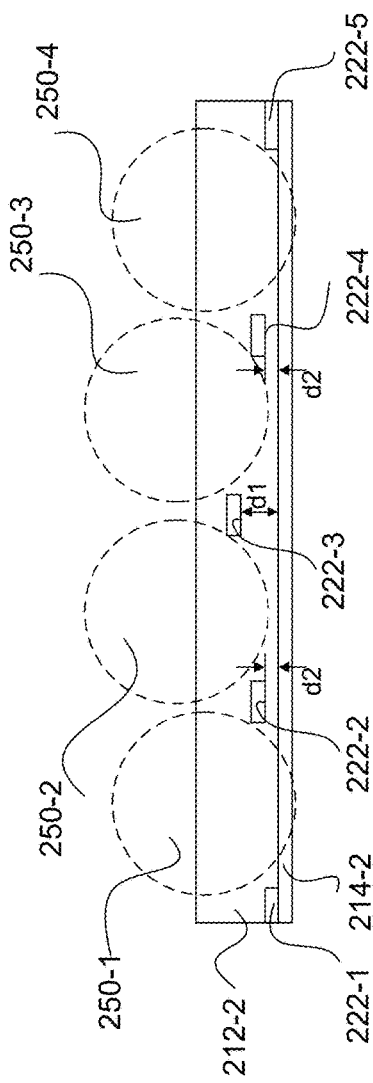
FIG. 2A
FIG. 2B

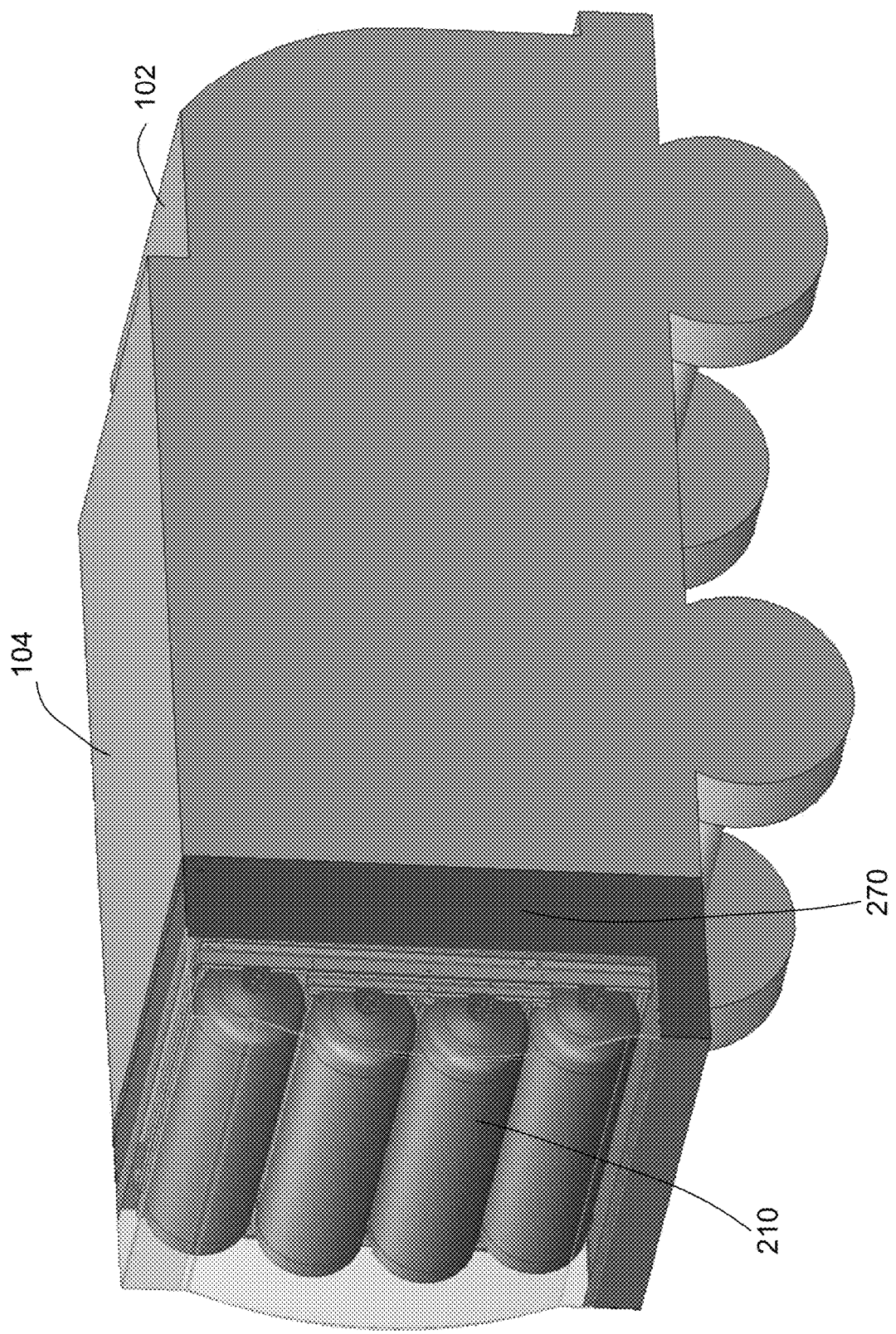

TAILGATE FUEL STORAGE SYSTEM

CROSS-REFERENCE TO RELATED APPLICATIONS

This application claims the benefit of U.S. provisional patent application No. 62/453,442 filed Feb. 1, 2017, and U.S. provisional patent application No. 62/492,798 filed May 1, 2017, both of which are herein incorporated by reference in their entirety.

BACKGROUND

Fuel storage systems including fuel containers and support structures thereof can be used to store and/or transport fuels such as compressed natural gas. Such systems may be mounted behind a vehicle cab, on or near a tailgate of the vehicle. The rear portion or tailgate of different types of vehicles may be provided in different shapes and/or sizes. For example, a tailgate may include a rounded portion, protrusions at one or more locations, etc. Typically, fuel storage systems are custom-built and can be difficult to assemble and/or dissemble, and changing the structural configuration of such systems to match different vehicle tailgates can therefore be difficult as well. Thus, needs exist for improved fuel storage systems that are easily adaptable for various tailgate configurations, and that can be incorporated into vehicle tailgates in a compact, structurally balanced, and aesthetic manner.

SUMMARY

Methods and systems for fuel storage and transportation are provided. According to some aspects of the invention, a support assembly for supporting a stacked arrangement of fuel containers and coupling to a tailgate of a vehicle is provided. The support assembly may comprise a plurality of end support members, and a plurality of side support members that are coupled to the plurality of end support members. Central axes of one or more of the fuel containers may be configured to be located on a different plane from central axes of one or more other fuel containers when supported by the support assembly, in a manner that permits the support assembly and the stacked arrangement of fuel containers to accommodate a shape of the tailgate. The shape of the tailgate may be one or more of rounded, arcuate, trapezoidal, triangular, or stepped.

The plurality of side support members may be located on different planes relative to the end support members. The end support members may include flanges. The plurality of side support members may comprise a first set of side support members located at a first distance from the flanges, a second set of side support members located at a second distance from the flanges, and a third set of side support members located at a third distance from the flanges. In some cases, the second distance may be less than the third distance. Conversely, the second distance may be greater than the third distance. Alternatively, the second distance may be equal to the third distance. At least one of the second distance or the third distance may be greater than the first distance. Alternatively, the first distance, second distance, and third distance may be equal to one another.

The different planes on which the central axes of the fuel containers are located may be parallel to each other. Alternatively, at least two of the different planes on which the central axes of the fuel containers are located may be non-parallel to each other. The central axes of the fuel containers may be configured to be located on the plurality of different planes when the fuel containers are supported by the support assembly. For example, the central axes of the fuel containers may be configured to be located on the plurality of different planes in a manner that permits a pressure load from vehicle cargo to be evenly distributed on the fuel containers and/or the tailgate. In some embodiments, the fuel containers are arranged on the tailgate to minimize pressure load from the fuel containers onto the tailgate, and in some cases, there may be no contact between the fuel containers and the tailgate at all.

The plurality of side support members may be detachably coupled to the plurality of end support members via a plurality of fasteners. Neck portions of the fuel containers may be coupled to neck support brackets mounted on one of the end support members, and side portions of the fuel containers may be supported by or in contact with the plurality of side support members. The neck support brackets can provide support for the neck portions of the fuel containers. The plurality of side support members can be configured to protect body portions of the fuel containers. In some embodiments, the fuel containers may be supported and/or held in place using straps wound around the body of the fuel containers. In some cases, the straps may replace the neck support brackets. In some cases, the straps may be used in conjunction with the neck support brackets to reinforce support for the fuel containers.

At least one of the side support members may be detachably coupled to both the first end support member and the second end support member. In some cases, the first end support member and the second end support member may be interchangeable. The plurality of side support members may be interchangeable. The plurality of end support members may comprise a first pair of end support members and a second pair of end support members disposed on different planes from one another. The first pair of end support members may be configured to support a first set of fuel containers. The second pair of end support members may be configured to support a second set of fuel containers different from the first set. The first and second sets of fuel containers may be disposed on different planes from one another. The first and second sets of fuel containers may be disposed on different planes from one another so as to form a recess in the stacked arrangement of the plurality of fuel containers, the recess being configured to accommodate the shape of the tailgate.

The first and second pairs of end support members may be parallel to one another. In some cases, the second pairs of end support members may be shorter than the first pairs of end support members. The second pairs of end support members may be coupled to central portions of the first pair of end support members. The central axes of the one or more of the fuel containers may be configured to be located on different plane from the central axes of the one or more other fuel containers when supported by the support assembly so as to form a recess in the stacked arrangement of the fuel containers, the recess being configured to accommodate the shape of the tailgate. In some cases, the fuel containers may comprise containers for compressed natural gas (CNG).

In some cases, the support assembly may comprise a first set and a second set of fuel containers that are supported by the support assembly. The first set of fuel containers may comprise central axes that are located on a first plane. The second set of fuel containers may comprise central axes that are located on a second plane different from the first plane. The first set of fuel containers may comprise at least two fuel containers, and the second set of fuel containers may comprise at least two fuel containers. The support assembly may comprise (1) first end support members configured to couple to the first set of fuel containers and (2) second end support members configured to couple to the second set of fuel containers. The first and second planes can be oriented to permit the support assembly and the stacked arrangement of fuel containers to accommodate the shape of the tailgate.

In some embodiments of the support assembly, the first plane and the second plane may be parallel to each other. The first plane and the second plane may be offset from each other by a fixed distance or a variable distance.

In other embodiments of the support assembly, the first plane and the second plane may be non-parallel to each other. For example, the first plane and the second plane may be inclined relative each other. The first plane and the second plane may intersect each other. In some alternative cases, the first plane and the second plane may not intersect each other. The first and second planes may be oriented at an acute angle relative to each other. Optionally, the first and second planes may be oriented at a right angle relative to each other. Alternatively, the first and second planes may be oriented at an obtuse angle relative to each other. In some cases, the first plane and the second plane may have substantially a same size or area. Alternatively, the first plane and the second plane may have substantially different sizes or areas.

In some embodiments, a position and/or an orientation of at least one of the first or second planes may be adjustable. In some cases, the positions and/or orientations of the first and second planes may be adjustable relative to each other. In some embodiments, at least some of the end support members or side support members may be movable relative to each other. For example, the position and/or orientation of at least one of the first or second planes can be adjusted by moving one or more of the end support members or side support members.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2A is a bottom perspective view of a fuel storage system, in accordance with an embodiment.

FIG. 2B is a side schematic view of the fuel storage system of FIG. 2A.

FIG. 5 is a perspective view of the tailgate fuel storage system of FIG. 4B attached and/or mounted to a vehicle.

DETAILED DESCRIPTION

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments described herein may be employed in practicing the invention. It is intended that the following claims define the scope of the invention and that methods and structures within the scope of these claims and their equivalents be covered thereby.

The invention provides systems and methods for storing and/or transporting fuels in accordance with aspects of the invention. Various aspects of the invention described herein may be applied to any of the particular applications set forth below or for any other types of tank attachment systems. The invention may be applied as a standalone system or method, or as part of a system (such as a vehicle) that utilizes fuel. It shall be understood that different aspects of the invention can be appreciated individually, collectively, or in combination with each other.

Figure 1:
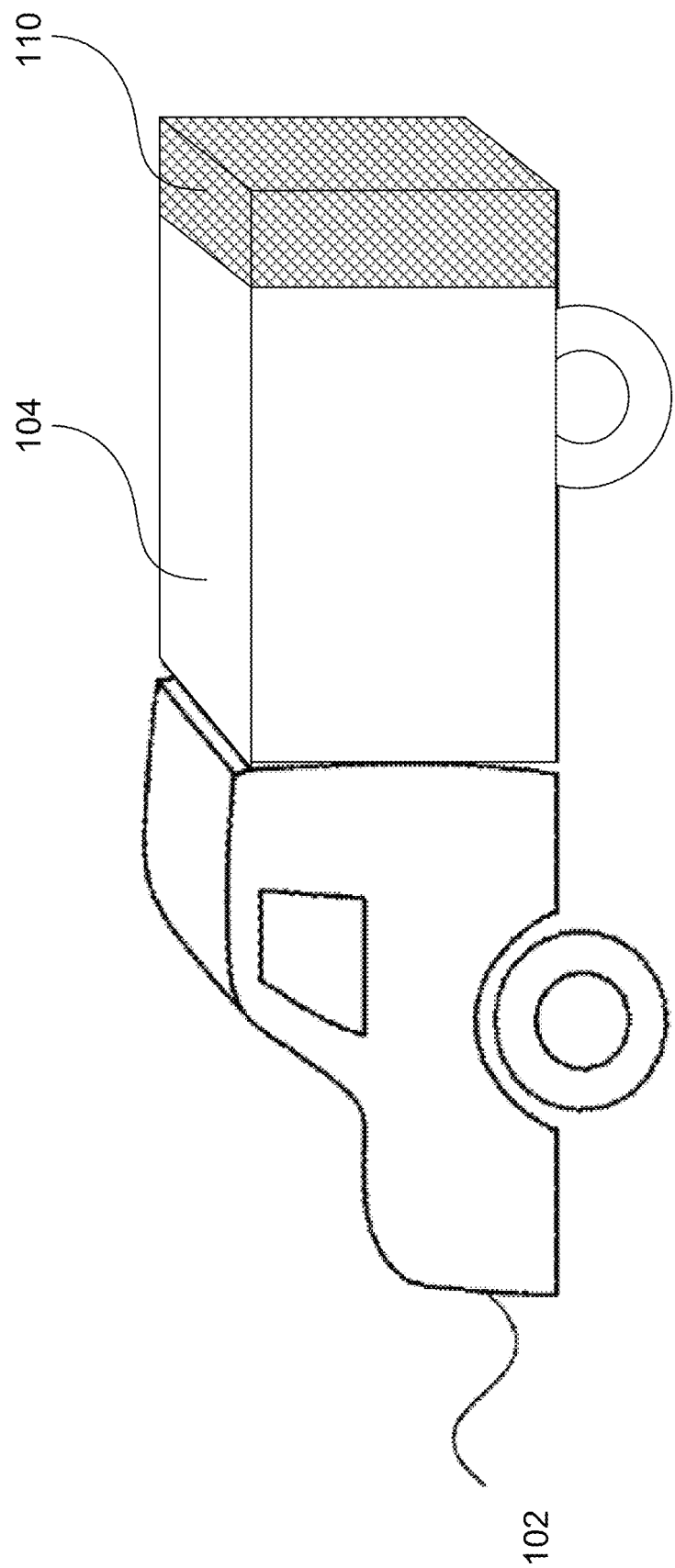
FIG. 1 is a schematic view of a tailgate fuel storage system attached and/or mounted to a vehicle.

FIG. 1 is a schematic view of a fuel storage system 110 attached and/or mounted to a vehicle. A vehicle as described herein may refer to any mobile machine or device designed or used to transport passengers or cargos. Examples of a vehicle may include bikes, cars, trucks, buses, motorcycles, trains, ships, boats, aircrafts and the like. A truck may include a light duty truck (e.g., class 1, class 2 or class 3), medium duty truck (e.g., class 4, class 5 or class 6), or heavy duty truck (e.g., class 7 or class 8). In some embodiments, the vehicles may be cars, wagons, vans, buses, high-occupancy vehicles, dump trucks, tractor trailer trucks, or any other vehicles. While a vehicle is illustrated herein, any other live or inanimate object or system (e.g., a building, a person, an animal, and a robot) may be attached to the fuel storage system discussed herein in any suitable manner including but not limited to the examples discussed herein.

Referring to FIG. 1, the fuel storage system 110 may be mounted behind a cab 102 of a vehicle, for example, to or within a tailgate of the vehicle. The tailgate may be located at a rear portion of the vehicle. In some cases, the fuel storage system and/or tailgate may be mounted onto a frame rail of the vehicle. The vehicle may also include a chassis for supporting a container 104. The container may be configured to hold and/or transport different materials, for example, waste (refuse), cargo, etc.

Although FIG. 1 shows the fuel storage system 110 being mounted to the rear of the vehicle, it is noted that the invention is not limited thereto. A fuel storage system may be mounted or attached to any suitable portion(s) of a vehicle, for example on one or more lateral sides, front side, or top side (e.g., roof) of the vehicle. In some embodiments, a fuel storage system may be mounted on a trailer or on a detachable portion of a vehicle. The location and/or manner of attachment of the fuel storage system to the vehicle may be based on a variety of factor including the capacity and type of the fuel containers, type of the vehicle, business requirement, and the like.

The fuel storage system 110 may be configured to support one or more fuel containers or vessels with the same or different characteristics. The fuel containers may be of any size, capacity, shape and/or weight and may be made of any suitable material. For example, the fuel containers may have a shape that is substantially cylindrical, rectangular, spherical, or the like. In addition, the fuel container(s) may be used to store any type(s) of fuel such as solid (e.g., coal), liquid (e.g., diesel) or gaseous fuels (e.g., natural gas). For example, gaseous fuels may include hydrogen or hydrogen based gas, hythane, H2CNG, or any other gas.

In some embodiments, a fuel container may be configured to store fuel at or above a certain amount of pressure and/or at or below a certain temperature. For example, the fuel container may be configured to store liquefied natural gas (LNG) at or below a predetermined temperature (e.g., −260° F.) or compressed natural gas (CNG) at or above a predetermined pressure (e.g., 3,600 psi). In some embodiments, the fuel containers may be constructed according standards promulgated by organizations such as the International Organization for Standardization (ISO), Canadian Standards Association (CSA), American National Standards Institute (ANSI), American Society for Testing and Materials (ASTM), American Society of Mechanical Engineers (ASM), Underwriters Laboratories (UL), etc.

In some embodiments, at least some of the fuel stored in the fuel storage system 110 may be used to power and/or propel the vehicle that carries the fuel storage system. The fuel may be a gaseous fuel, such as natural gas. The fuel may be contained within a gaseous fuel containing device, such as a tank, vessel, or any other type of device capable of containing a gaseous fuel. Any description herein of a fuel tank, vessel, or any other type of gaseous fuel containing device may be applicable to any other type of gaseous fuel containing device. The gaseous fuel containing device may be capable of containing a fuel with a certain amount of pressure. For example, the gaseous fuel containing device may be capable of containing a fuel having less than or equal to about 10000 psi, 8000 psi, 7000 psi, 6500 psi, 6000 psi, 5500 psi, 5000 psi, 4750 psi, 4500 psi, 4250 psi, 4000 psi, 3750 psi, 3500 psi, 3250 psi, 3000 psi, 2750 psi, 2500 psi, 2000 psi, 1500 psi, 1000 psi, 500 psi, 300 psi, 100 psi, or less.

In other embodiments, none of the fuel stored in the fuel storage system 110 is actually used to power the vehicle. Such may be the case for a mobile fuel station that is used to provide fuel in contingency or emergency situations.

In some embodiments, the fuel storage system may include one or more fuel container support assemblies (hereinafter support assemblies) used to support and/or secure fuel containers. In some cases, a support assembly is configured to support only one fuel container. Alternatively, a support assembly may be used to support a plurality of fuel containers. Such support assemblies may be used to stabilize, support or otherwise protect the fuel containers from damage caused by movement (such as during transit), external impact, natural elements, and the like.

The support assemblies may be easily adapted for various tailgate configurations. The positions and/or dimensions of one or more support members within the support assemblies can be easily adjusted to accommodate vehicle tailgates of different shapes and/or sizes. For example, a tailgate may include a rounded portion, protrusions at one or more locations, etc. The tailgate may have regular or irregular shapes, and may be symmetrical or non-symmetrical. In some cases, the tailgate may comprise an arcuate portion (e.g., a curved "bow-like" portion). The support assemblies may be configured to match different rounded portions, protrusions, arcuate portions, and the like, which allows the fuel support system to be incorporated into vehicle tailgates in a compact, structurally balanced, and aesthetic manner.

In various embodiments, a fuel storage system described herein may include an arbitrary number of support assemblies and the support assemblies of the fuel storage system may be arranged according to different configurations to accommodate different requirement or circumstances, such as storage space dimensions, weight restrictions, and the like. For example, the configuration of the support assemblies may be customized to fit a particular storage space (e.g., on a vehicle, in a warehouse). As another example, the support assemblies of the fuel storage system may be detachably coupled to each other or separately located.

As described above, the fuel storage system can be coupled to or incorporated as part of a tailgate of a vehicle. A tailgate may be secured to the container 104 or a portion of the vehicle using hinges. The hinges may be coupled to pivot pins, such that the tailgate and fuel storage system can rotate as a whole relative to the container or vehicle. The rotation can be achieved using different actuation mechanisms, for example hydraulic cylinders, motors, linkages, etc. In some embodiments, the container 104 may include an opening located at the rear of the vehicle. The tailgate may be designed to match the opening of the container, such that the tailgate serves as a door/lid to the container. An actuation mechanism can be configured to move the tailgate between a closed position and an open position. When the tailgate is in the closed position, the tailgate closes the opening to the container, thereby preventing access to the inside of the container. Conversely, when the tailgate is in the open position, the tailgate may be rotated upwards so as to permit access to the inside of the container.

Various embodiments of the support assemblies within a fuel storage system are next described with reference to figures. For example, FIGS. 2A-2I and 3A-3H illustrate exemplary ways in which a support assembly of a fuel storage system may be configured.

FIG. 2A is a bottom perspective view of a fuel storage system 210, in accordance with an embodiment. The fuel storage system may comprise a support assembly 211 configured to hold/support one or more fuel containers 250, shown as 250-1, 250-2, 250-3, and 250-4. The fuel containers 250 will typically have a cylindrical shape having a central axis which may be coaxial with an outlet end of the fuel container 250 and may be configured to contain any of the fuels described herein. The fuel containers 250 may have other shapes as well.

The support assembly 211 may include two opposing end frames and a plurality of side support members 222 (shown as 222-1, 222-2, 222-3, and 222-4) connected longitudinally between the two opposing end frames. An end frame 212 may be used to protect a portion at or near an end of one or more fuel containers supported by the support assembly. An end frame may also provide support for the distal portions of one or more fuel containers 250 supported by the support assembly 211. Referring to FIG. 2A, the end frames may include a first end support member 212-1 and a second end support member 212-2. In some embodiments, the end frame may further include a plurality of auxiliary end support members 216, for example a first auxiliary end support member 216-1 and a second auxiliary end support member 216-2. The first auxiliary end support member 216-1, 216-2 may be attached to a central portion of the first end support member 212-1, and the second auxiliary end support member 212-1 may be attached to a central portion of the second end support member. The auxiliary end support members 216, in conjunction with the side support members 212, can be used to create longitudinal position differences between two or more fuel containers that are held by the support assembly. For instance, the top fuel container 250-1 and the bottom fuel container 250-4 coupled to the first and second end support members 212-1, 212-2 are offset from the middle fuel containers 250-3, 250-4 coupled to the auxiliary end support members 216-1, 216-2, forming a partially hexagonal stack of fuel containers 250 with a recess toward the middle fuel containers 250-3, 250-4 to accommodate the shape of a tailgate The longitudinal position differences can be adjusted to accommodate tailgates of different shapes/sizes/dimensions, as described later herein.

The two end frames 212-1, 212-2 of the support assembly may be identical or different. In some embodiments, one of the end frames 212 may be configured to support or interface with a particular end (e.g., top, neck, or fuel outlet end) of a fuel container, while the other end frame is may be configured to support or interface with the opposite end (e.g., bottom) of the fuel container. Thus, the two end frames may be different. For example, the auxiliary end support member 216-1 (of an end frame) may include one or more neck support brackets 228 mounted thereon for supporting the neck portions 252 of fuel containers 250, while the auxiliary end support member 216-2 (of an opposing end frame) may not have such an opening. Thus, the end support members 216-1, 216-2 for the bottom portion of the fuel container may not be configured to provide support for the top portion of the fuel container.

In some other embodiments, the two end frames of the support assembly may be substantially similar. For example, the end support members 212-1 and 216-1 may be substantially the same as end support members 212-2 and 216-2, respectively. In such cases, both end frames 212-1, 212-2 may be configured to support or interface with both the top and the bottom of a fuel container 250. For example, in some cases, both the top portion and the end portion (i.e., the longitudinal end portions) of the fuel container 250 may have neck portions that are supported by the end support members of the end frames. In some instances, the two end frames of the support assembly and the components thereof may be interchangeable, thereby lowering the cost of manufacturing and/or assembly of the fuel module.

The end support members 212 and 216 may be structurally reinforced to bear the load of the fuel containers. The cross-sections of the end support members along their longitudinal directions may have any shape (e.g., U-shape, I-shape, T-shape, H-shape, etc.) that improves the structural rigidity of the end support members 212. For example, each of the end support members 212 may include a bottom flange 214 and a top flange 215 separated by a web 213. Similarly, each of the auxiliary end support members 216 may include a bottom flange 217 and a top flange 218 separated by a web 219. The bottom flanges 217 of the auxiliary end support members 216 may be attached to the top flanges 215 of the respective end support members 212. Exemplary means of attachment may include nuts and bolts, rivets, screws, nails, locks, latches, wires, joints, soldering, welding, gluing and the like. In some embodiments, the auxiliary end support members 216 may be attached to the end support members 212 using mounting brackets, for example mounting brackets 220-2, 220-3, and 220-4.

The end support members 212 and the auxiliary end support members 216 may have different lengths. For example, the end support members 212 may be longer than the auxiliary end support members 216, by at least 10%, 20%, 30%, 40%, or 50%. The auxiliary end support members 216 may be attachable to different portions of the end support members 212. In some embodiments, the auxiliary end support members 216 may be attached symmetrically at the center of the respective end support members 212, such that the auxiliary end support members 216 are substantially equidistant from opposite ends of the end support members 212. In other embodiments, the auxiliary end support members 216 may be attached in a non-symmetrical manner on the end support members 212, for example near the end portion of the end support members 212. Any arrangement of the auxiliary end support members 216 and the end support members 212 relative to each other may be contemplated.

One, two, three or more side support members may be used to connect and/or secure the two end frames. For example, referring to FIG. 2A, the support assembly 211 may include a plurality of side support members 222 connected longitudinally between the two opposing end frames. The plurality of side support members may include a first side support member 222-1, a second side support member 222-2, a third side support member 222-3, a fourth side support member 222-4, and a fifth side support member 222-5. The side support members 222 can prevent or reduce movement or damage to the body or sides of a fuel container 250 supported therein. As used herein, the term "side support member" is used to refer to the component of the support assembly that protects one side (but not the top or bottom) of a fuel container. In one embodiment, the side support member 222 may be formed by a single-piece surface structure. Alternatively, a side support member 222 may be formed by a plurality of side frames with zero or more truss members located in between.

The side support members 222 may be coupled to the end support members 212 using mounting brackets 220. For example, one end of the first side support member 222-1 may be coupled to one end of the end support member 212-1 using a mounting bracket 220, whereas an opposite end of the first side support member 222-1 may be coupled to one end of the end support member 212-2 using another mounting bracket 220. The other side support members 222-2, 222-3, 222-4, and 222-5 may be coupled to the end support members 212-1 and 212-2 in a similar fashion, along the length of the end support members. In some cases, the support members 222 may be easily attached to and/or detached from the end support members 212, so as to lower the cost of associated with assembly and/or dissembling of the support assembly 211.

The fuel containers 250 may be disposed on different regions of the support assembly 211. A first region 223-1 may be bounded by the end support members 212 and the first/second side support members 222-1/222-2. Similarly, a second region 223-2 may be bounded by the end support members 212 and the second/third side support members 222-2/222-3. Likewise, a third region 223-3 may be bounded by the end support members 212 and the third/fourth side support members 222-3/222-4. A fourth region 223-4 may be bounded by the end support members 212 and the fourth/fifth side support members 222-4/222-5. The first through fourth regions may be configured to accommodate the plurality of fuel containers 250. For example, a first fuel container 250-1 may be disposed in the first region 223-1, a second fuel container 250-2 may be disposed in the second region 223-2, a third fuel container 250-3 may be disposed in the third region 223-3, and a fourth fuel container 250-4 may be disposed in the fourth region 223-4.

While the first through fourth regions described herein are illustrated as having rectangular shapes, it is understood that, in various embodiments, the regions may take on any suitable shapes such as circular, triangular, or any polygonal shape (e.g., hexagonal), and the like. In some embodiments, the support assembly and the regions formed therein are shaped to improve spatial efficiency, weight, cost, and the like, of the overall fuel storage system. For example, a support assembly shaped in a rectangular manner can be easily stacked or placed adjacent to other similar-shaped support assemblies, thereby providing spatial efficiency. In some embodiments, two or more support assemblies can be stacked on top of each other in a substantially vertical or horizontal fashion. The support assemblies may be arranged using a combination of the illustrated methods or using any other suitable methods. For example, the support assemblies may be arranged in two-dimensional or three-dimensional arrays or to form other regular or irregular shapes. Advantageously, the structure of the support assemblies described herein allows the support assemblies to be arranged into arbitrary configurations to accommodate any particular requirement or limitation (e.g., different tailgate designs, space restrictions, etc.).

A plurality of neck support brackets 228 may be provided on the end support members 212 or auxiliary end support members 216. For example, a first neck support bracket 228-1 may be attached to one side of the first end support member 212-1, and a fourth neck support bracket 228-4 may be attached to an opposite side of the first end support member 212-1. The first neck support bracket may include a groove configured to receive the neck portion 252-1 of the first fuel container, and the second neck support bracket may include a groove configured to receive the neck portion 252-4 of the fourth fuel container.

Similarly, a second neck support bracket 228-2 may be attached to one side of the first auxiliary end support member 216-1, and a third neck support bracket 228-3 may be attached to an opposite side of the first auxiliary end support member 216-1. The second neck support bracket may include a groove configured to receive the neck portion 252-2 of the second fuel container, and the third neck support bracket may include a groove configured to receive the neck portion 252-3 of the third fuel container.

The neck support brackets 228 may be located on a same plane or on different planes. For example, referring to FIG. 2A, the first and fourth neck support brackets 228-1 and 228-4 may be located on a same plane since they are attached coplanar on the top flange 215 of the first end support member 212-1. Conversely, the second and third neck support brackets 228-2 and 228-3 may be located on another same plane since they are attached coplanar on the top flange 218 of the first auxiliary end support member 216-1. As a result, the fuel containers 250 may lie on different planes. For example, the first and fourth fuel containers 250-1 and 250-4 may lie on a first plane, and the second and third fuel containers 250-2 and 250-3 may lie on a second plane. The first and second planes may be parallel to each other. Alternatively, the first and second planes may be orthogonal to each other. In some embodiments, the first and second planes may be oblique to each other. Accordingly, the fuel containers may be supported in various configurations on the support assembly, so as to accommodate vehicle tailgates of different shapes and/or sizes.

Figure 6A:
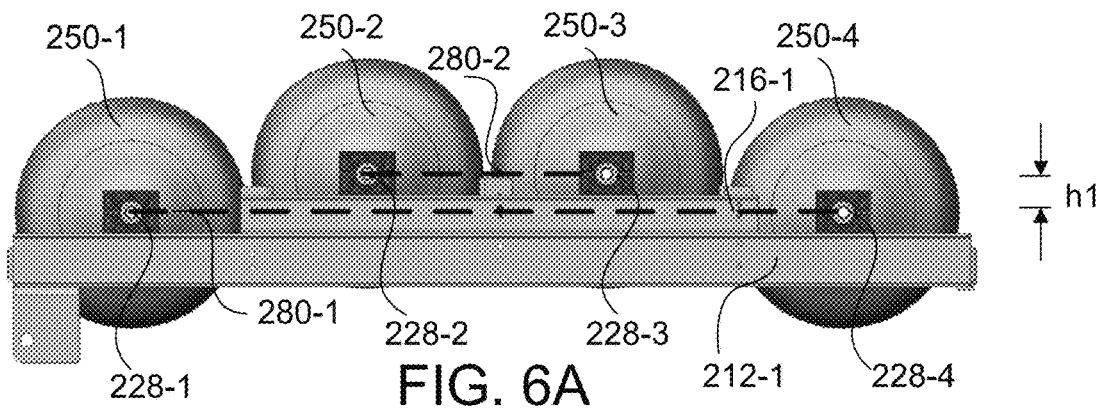
FIG. 6A is a side view of a tailgate fuel storage system comprising fuel containers located on different parallel planes.
Figure 6B:
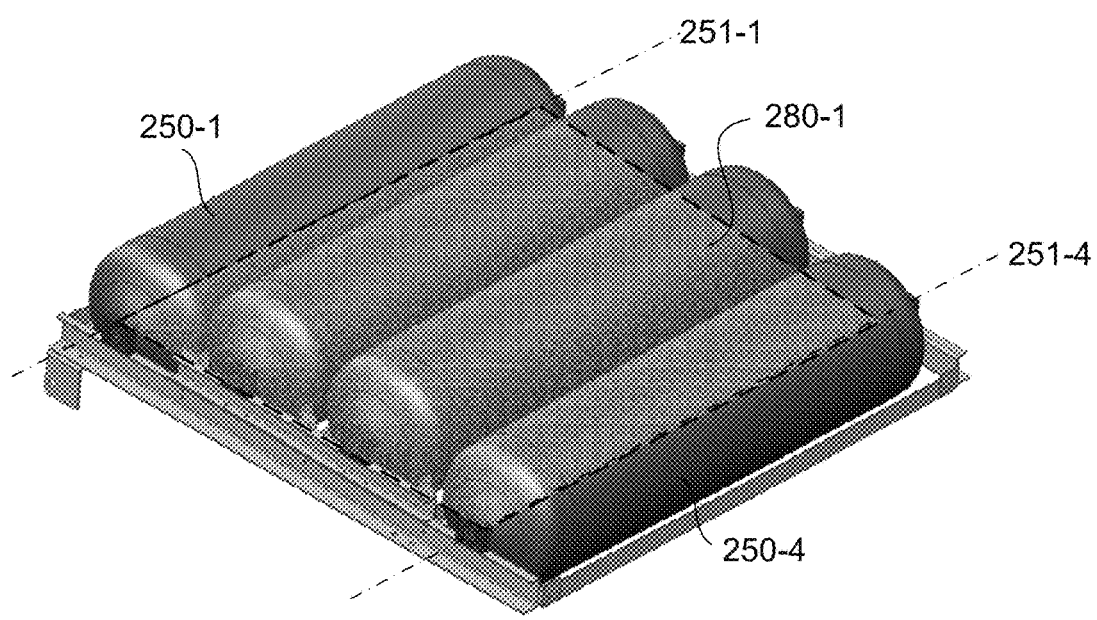
FIG. 6B is a perspective view of the tailgate fuel storage system of FIG. 6A showing a first set of fuel containers located on a first plane.
Figure 6C:
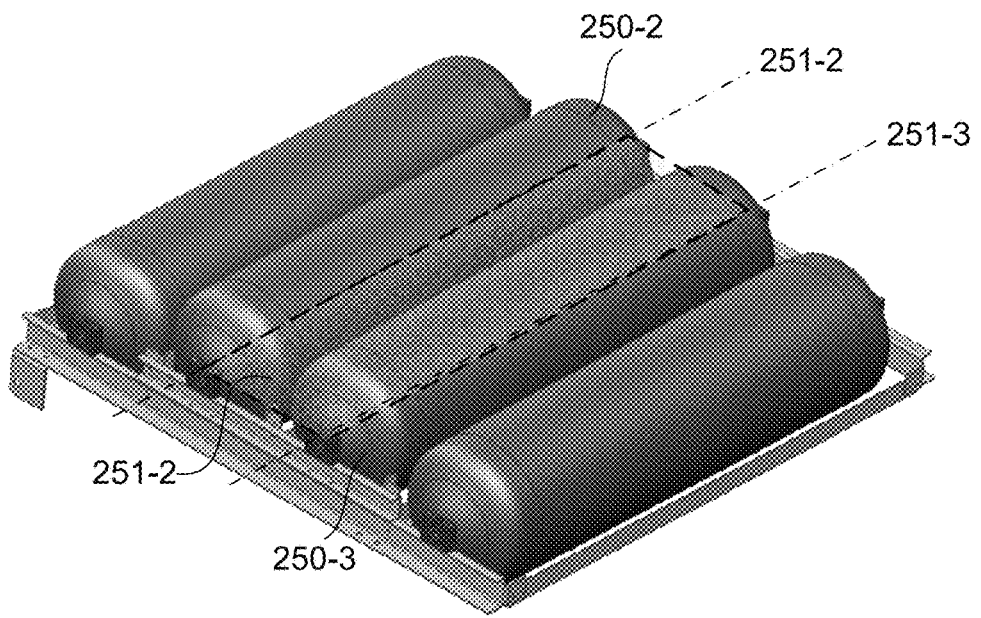
FIG. 6C is a perspective view of the tailgate fuel storage system of FIG. 6A showing a second set of fuel containers located on a second plane that is parallel to the first plane.

Different sets of fuel containers can be located or provided on different planes, and the planes can be oriented in various configurations (e.g. parallel, oblique, inclined, orthogonal, intersecting, non-intersecting, etc.). As an example, FIG. 6A is a side view of a tailgate fuel storage system comprising fuel containers located on different parallel planes. The tailgate fuel storage system may correspond, for example to the system shown in FIG. 2D. The system may comprise a first set of fuel containers 250-1 and 250-4 that lie on a first plane 280-1, and a second set of fuel containers 250-2 and 250-3 that lie on a second plane 280-2. The planes 280-1 and 280-2 may be substantially parallel to each other. The fuel containers 250-1, 250-2, 250-3, and 250-4 may include central axes 251-1, 251-2, 251-3, and 251-4 extending longitudinally along lengths of the respective containers. FIG. 6B is a perspective view showing the first set of fuel containers 250-1 and 250-4 located on the first plane 280-1, and FIG. 6C is a perspective view showing the second set of fuel containers 250-2 and 250-3 located on the second plane 280-2. As shown in FIGS. 6A and 6B, the central axes of the 251-1 and 251-4 of the first set of containers may be located on the first plane 280-1, while the central axes of the 251-2 and 251-3 of the second set of containers may be offset from the first plane by a distance h1 in a first direction. Similarly, referring to FIGS. 6A and 6C, it can be observed that the central axes of the 251-2 and 251-3 of the second set of containers may be located on the second plane 280-2, while the central axes of the 251-1 and 251-4 of the first set of containers may be offset from the second plane by the distance h1 in a second direction opposite to the first direction. The size/shape/dimensions of each plane, as well as the distance and relative orientations between the two planes, can be configured to accommodate vehicle tailgates of different shapes and/or sizes. For example, the offset h1 between the first and second planes can be customized to fit any underlying vehicle tailgate. This can be achieved, for example by modifying the thickness/height of the auxiliary end support members 216, and/or the thickness/height of the neck support brackets 228 shown in FIG. 2A. The aforementioned thicknesses/heights can be modified using spacers, standoff plates, washers, adjustable lead screws, extension mechanisms, and the like. A size of a plane may depend on the spacing between the set of containers lying on that plane. For example, referring to FIGS. 6B and 6C, the first plane 280-1 may extend over a larger surface area compared to the second plane 280-2. The size/area of the plane 280-1 may be at least 10%, 20%, 30%, 40%, or 50% greater than the size/area of the plane 280-2.

Figure 7A:
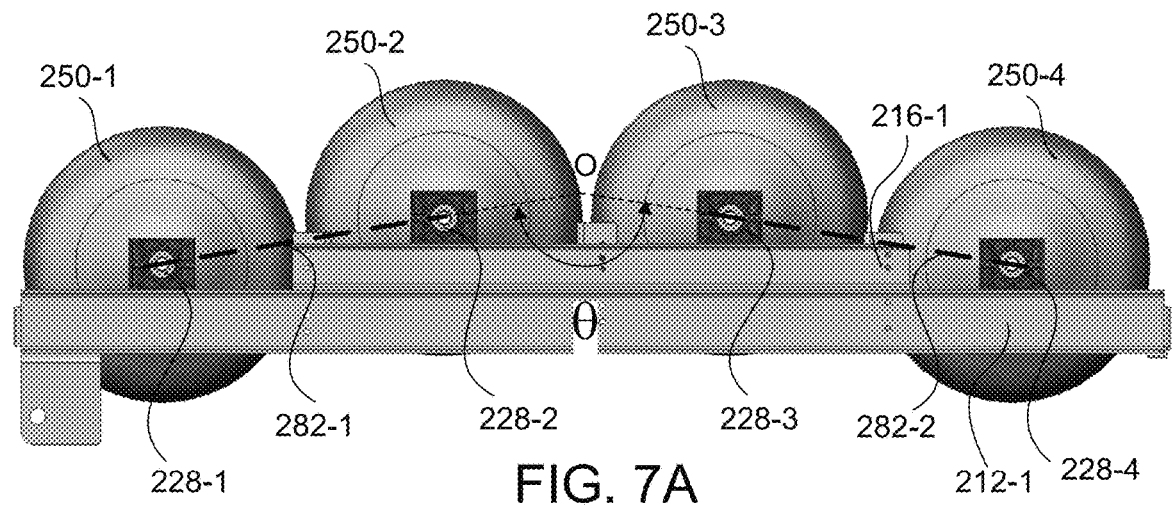
FIG. 7A is a side view of a tailgate fuel storage system comprising fuel containers located on different inclined planes, in accordance with an embodiment.
Figure 7B:
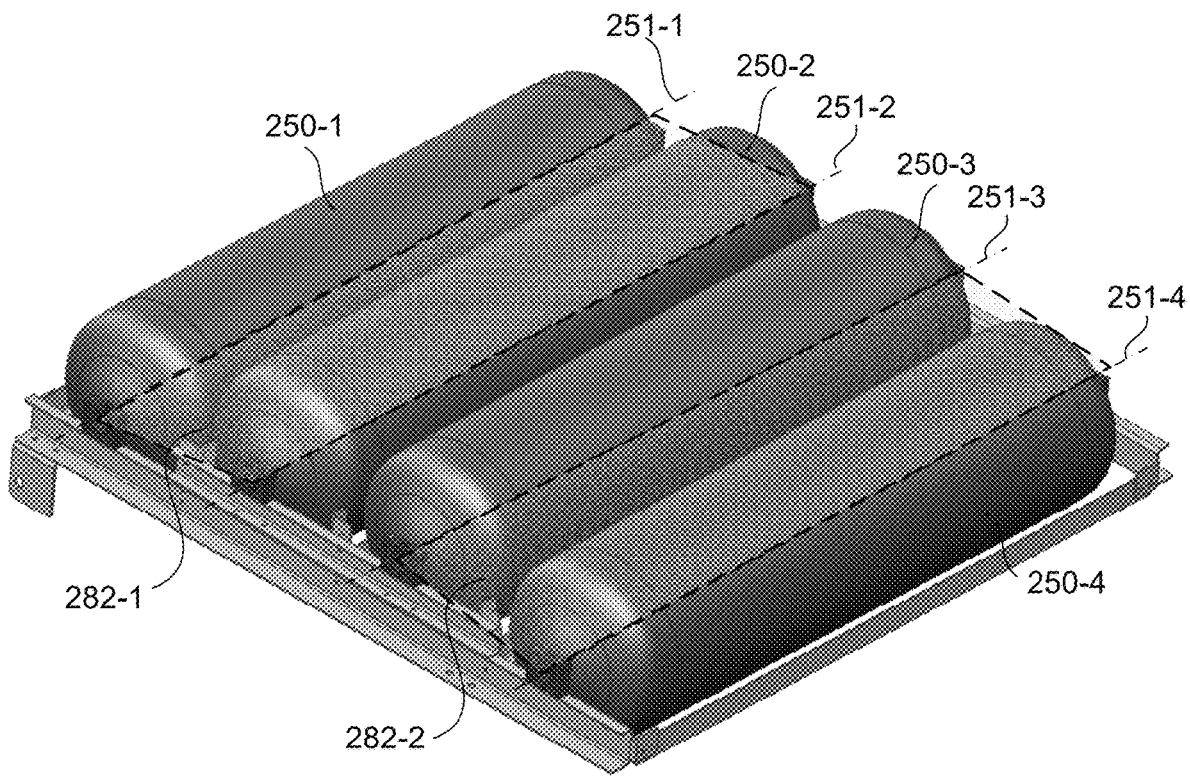
FIG. 7B is a perspective view of the tailgate fuel storage system of FIG. 7A showing different sets of fuel containers located on different inclined planes.

FIGS. 7A-7B and FIGS. 8A-8C illustrate different sets of fuel containers that are located on non-parallel planes. The planes may or may not intersect with one another. As an example, FIG. 7A is a side view of a tailgate fuel storage system comprising fuel containers located on different non-parallel planes, and FIG. 7B is a corresponding perspective view. The system may comprise a first set of fuel containers 250-1 and 250-2 that lie on a first plane 282-1, and a second set of fuel containers 250-3 and 250-4 that lie on a second plane 282-2. The planes 282-1 and 282-2 may be non-parallel to each other, and may be inclined relative to each other. The planes 282-1 and 282-2 may not intersect with each other (i.e. may not meet). As shown in FIG. 7B, the central axes 251-1 and 252-2 of the first set of fuel containers may be located on the plane 282-1, while the central axes of the 251-1 and 252-3 of the second set of containers may be located on the plane 282-2. The planes 282-1 and 282-2 may have substantially the same size, in contrast to FIGS. 6B and 6C where the planes 280-1 and 280-2 have substantially different sizes.

Referring to FIG. 7A, the planes 282-1 and 282-2 can be extended to meet an imaginary point O, with an angle θ between the two planes. The angle may be an acute angle, a right angle, or an obtuse angle. The size/shape/dimensions of each plane, as well as the distance and relative orientations between the two planes, can be configured to accommodate vehicle tailgates of different shapes and/or sizes. The angle θ between the planes 282-1 and 282-2 can be customized to fit any underlying vehicle tailgate. This can be achieved, for example by modifying the thickness/height of the auxiliary end support members 216, and/or the thickness/height of the neck support brackets 228 as described elsewhere herein. In some embodiments, the neck support brackets 228 may be movable relative to the end support members 212 or auxiliary end support members 216. The auxiliary end support members 216 may also be movable relative to the end support members 212. One or more side support members may be movable relative to one or more end support members or auxiliary end support members. Non-limiting examples of the relative motion may include translation and/or rotation in one or more dimensions. The relative motion may be enabled using one or more mechanical elements. Non-limiting examples of mechanical elements can include slots, grooves, channels, sliding mechanisms, screws, gears, cams, linear drives, belts, pulleys, conveyors, springs, and the like. Accordingly, the angle θ between the planes 282-1 and 282-2 can be changed by moving the neck support brackets 228 relative to the end support members 212 or auxiliary end support members 216, and/or by moving the auxiliary end support members 216 may also be movable relative to the end support members 212. In some embodiments, a larger angle θ can be provided to accommodate a less protruded tailgate (e.g. having a less arcuate shape), while a smaller angle θ can be provided to accommodate a more protruded tailgate (e.g. having a more arcuate shape).

Figure 8A:
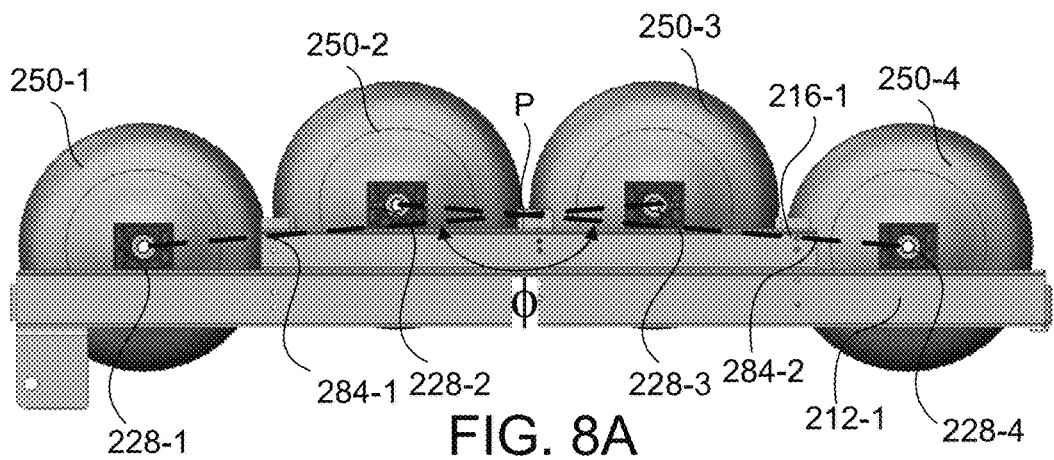
FIG. 8A is a side view of a tailgate fuel storage system comprising fuel containers located on different inclined planes, in accordance with another embodiment.
Figure 8B:
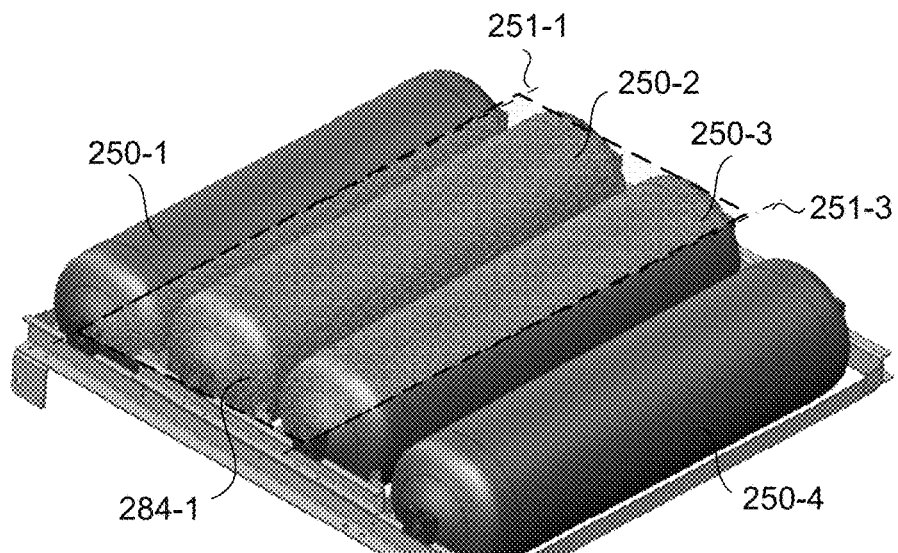
FIG. 8B is a perspective view of the tailgate fuel storage system of FIG. 8A showing a set of fuel containers located on an inclined plane.
Figure 8C:
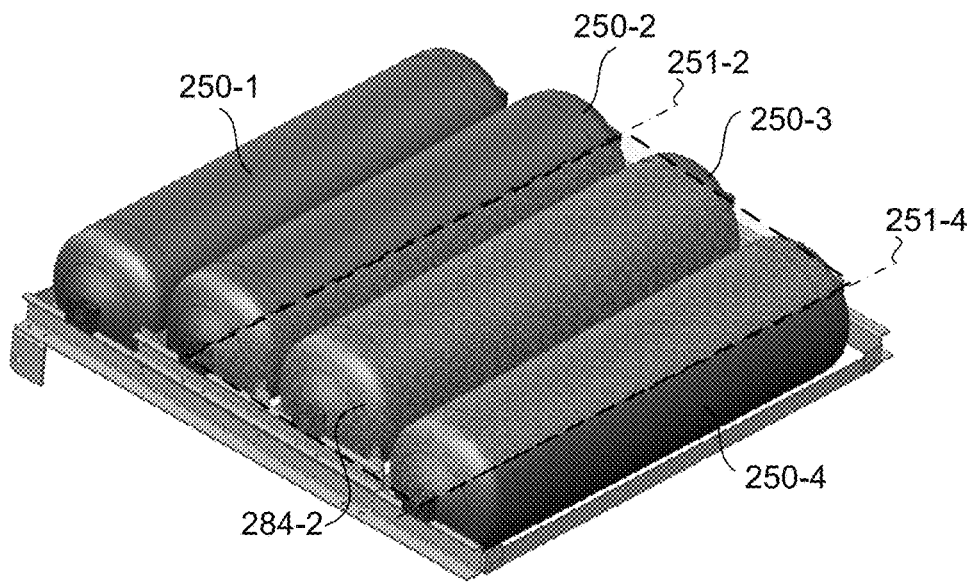
FIG. 8C is a perspective view of the tailgate fuel storage system of FIG. 8A showing another set of fuel containers located on another inclined plane.

In some embodiments, different sets of fuel containers may be located on different inclined planes that intersect with one another. As an example, FIG. 8A is a side view of a tailgate fuel storage system comprising fuel containers located on different non-parallel planes, and FIGS. 8B and 8C are corresponding perspective views depicting the respective planes. The system may comprise a first set of fuel containers 250-1 and 250-3 that lie on a first plane 284-1, and a second set of fuel containers 250-2 and 250-4 that lie on a second plane 284-2. The planes 284-1 and 284-2 may be non-parallel to each other, and may be inclined relative to each other. The planes 284-1 and 284-2 in FIGS. 8A-8C can intersect and overlap with each other. The central axes 251-1 and 252-3 of the first set of fuel containers may be located on the plane 284-1, while the central axes of the 251-2 and 252-4 of the second set of containers may be located on the plane 284-2. The planes 284-1 and 284-2 may have substantially the same size. The size/area of the planes 284-1 and 284-2 in FIGS. 8B-8C may be larger than the size/area of the planes 282-1 and 282-2 in FIG. 7B.

Referring to FIG. 8A, the planes 284-1 and 284-2 may intersect at point P, with an angle between the two planes. The angle may be an acute angle, a right angle, or an obtuse angle. The planes 284-1 and 284-2 may also overlap with each other. The planes 284-1 and 284-2 may overlap with each other by different amounts, e.g. by at least 10%, 20%, 30%, 40%, or 50%. The size/shape/dimensions of each plane, as well as the distance and relative orientations between the two planes, can be configured to accommodate vehicle tailgates of different shapes and/or sizes. The angle φ between the planes 284-1 and 284-2 can be customized to fit any underlying vehicle tailgate. This can be achieved, for example by modifying the thickness/height of the auxiliary end support members 216, and/or the thickness/height of the neck support brackets 228 as described elsewhere herein. In some embodiments, the neck support brackets 228 may be movable relative to the end support members 212 or auxiliary end support members 216. The auxiliary end support members 216 may also be movable relative to the end support members 212. One or more side support members may be movable relative to one or more end support members or auxiliary end support members. Non-limiting examples of the relative motion may include translation and/or rotation in one or more dimensions. The relative motion may be enabled using one or more mechanical elements as described elsewhere herein. Accordingly, the angle φ between the planes 284-1 and 284-2 can be changed by moving the neck support brackets 228 relative to the end support members 212 or auxiliary end support members 216, and/or by moving the auxiliary end support members 216 may also be movable relative to the end support members 212. In some embodiments, a larger angle φ can be provided to accommodate a less protruded tailgate (e.g. having a less arcuate shape), while a smaller angle φ can be provided to accommodate a more protruded tailgate (e.g. having a more arcuate shape). The angle φ in FIGS. 8A-8C may be different from the angle θ in FIGS. 7A-7B. The angle φ may depend on the angle θ. Alternatively, the angle φ may be varied independently of the angle θ. The angles φ and θ can be customized to have different values and/or different ratios to accommodate different vehicle tailgate shapes or designs, consistent with the embodiments described elsewhere herein.

The support assembly 211 may also include pivot brackets 224 coupled to the end support members 212. For example, a first pivot bracket 224-1 may be attached to one end of the end support member 212-1, and a second pivot bracket 224-2 may be attached to another corresponding end of the end support member 212-2. The first and second pivot brackets 224 may include holes 226 that permit the support assembly to be hinged to a vehicle tailgate (not shown). The hinging mechanism may include pivot pins (not shown) that pass through the holes 226, and that allow the support assembly to rotate/pivot the tailgate. As previously described, the tailgate can be rotated to move between a closed position (preventing access to the container) or an open position (allowing access to the container).

In some embodiments, one or more mating members may be provided to guide and/or interlock the support assembly onto a vehicle tailgate. The mating members may include one or more pins that protrude from the support assembly, and that can be used to guide the support assembly into one or more receiving brackets mounted on the vehicle tailgate. The receiving brackets may include, for example one or more grooves having a length or profile for guiding, receiving, and engaging the pins. For example, a pin may be configured to move in a groove to an end position such that the pin clicks or interlocks in the end position. The interlock may be permanent or reversible. For example, the mating members may interlock such that dislocation is not possible without application of a predetermined amount of force. Embodiments may also provide mating features to complement each other to lock the brackets in place with respect to each other. For example, engagement of a circular pin member on the support assembly with a mating member (e.g., a circular cutout shape) on the vehicle tailgate may restrict relative movement between the support assembly and the vehicle tailgate in one or more degrees of freedom (e.g. translation), while permitting relative movement between the support assembly and the vehicle tailgate in one or more other degrees of freedom (e.g., rotation). Such mutual restraint may be particularly beneficial in holding the support assembly in place while permitting the support assembly to be movable (rotatable) relative to the vehicle tailgate. Any of the components within the support assembly 211 can be detachably coupled to one another in a variety of different structural configurations. The means of detachment and/or attachment between different components of the support assembly may include the use of one or more fasteners. The fasteners may be an inherent part of the support assembly (e.g., tongue and groove, wedge and slide, joints and the like) or external to the support assembly (e.g., wires, locks, glue, welding, and the like). Exemplary means of fastening two or more components in a support assembly may include nuts and bolts, nails, locks, latches, wires, joints, soldering, welding, gluing and the like. In other embodiments, two or more components in a support assembly may simply be placed or stacked adjacent to one another without any fastening mechanism. The above permits the support assembly to easily accommodate tailgates of different shapes and/or sizes, and eliminates the need for custom-built support assemblies which can be costly and/or difficult to assemble and disassemble.

FIG. 2B is a side schematic view of the fuel storage system of FIG. 2A, showing the staggered layout of the side support members 222 and fuel containers 250. The side support members may be disposed at different locations on different planes. Referring to FIG. 2B, the first and fifth side support members 222-1 and 222-5 may be disposed at opposite ends of the end support members 212-1 and 212-2. For example, the first and fifth side support members 222-1 and 222-5 may be located on a first plane located on or near to the bottom flanges 214 of the end support members 212-1 and 212-2. The second, third and fourth side support members 222-2, 222-3 and 222-4 may be disposed sequentially between the first and fifth side support members 222-1 and 222-5. The second and fourth side support members 222-2 and 222-4 may be located on a second plane located at a distance d2 from the bottom flanges 214. The third side support member 222-3 may be located on a third plane located at a distance d3 from the bottom flanges 214. The first, second, and/or third planes may be parallel to one another. Alternatively, the first, second, and/or third planes need not be parallel to one another, and may be orthogonal or oblique to one another. In some embodiments, d1 may be greater than d2. Alternatively, in other embodiments, d1 may be less than d2. The values of d1 and d2 can be adjusted to accommodate tailgates of different shapes and/or sizes. In some embodiments, d1 may be greater than d2 by at least 5%, 10%, 15%, 20%, 25%, 30%, 40%, 45%, or 50%. In some cases, a ratio of d1 to d2 may be 1:1, 2:1, 3:1, 4:1, or 5:1. Any values of d1 and d2, and ratio of d1 to d2, may be contemplated.

The fuel containers 250 may be designed to contact with the side support members when supported therein. As shown in FIG. 2B, a portion of the first fuel container 250-1 may be in contact with the second side support member 222-2, a portion of the second fuel container 250-2 may be in contact with the third side support member 222-3, and so forth. Accordingly, the neck portion 252-1 of the first fuel container 250-1 is supported by the first neck support bracket 228-1, and a longitudinal side portion of the first fuel container is supported by the second side support member 222-2. Similarly, the neck portion 252-2 of the second fuel container 250-2 is supported by the second neck support bracket 228-2, and a longitudinal side portion of the second fuel container is supported by the third side support member 222-3. The third and fourth fuel containers 250-3 an 250-4 are respectively supported by the neck support brackets 228-3 and 228-4, and the fourth and fifth side support members 222-4 and 222-5, in a similar fashion.

Figure 2C:
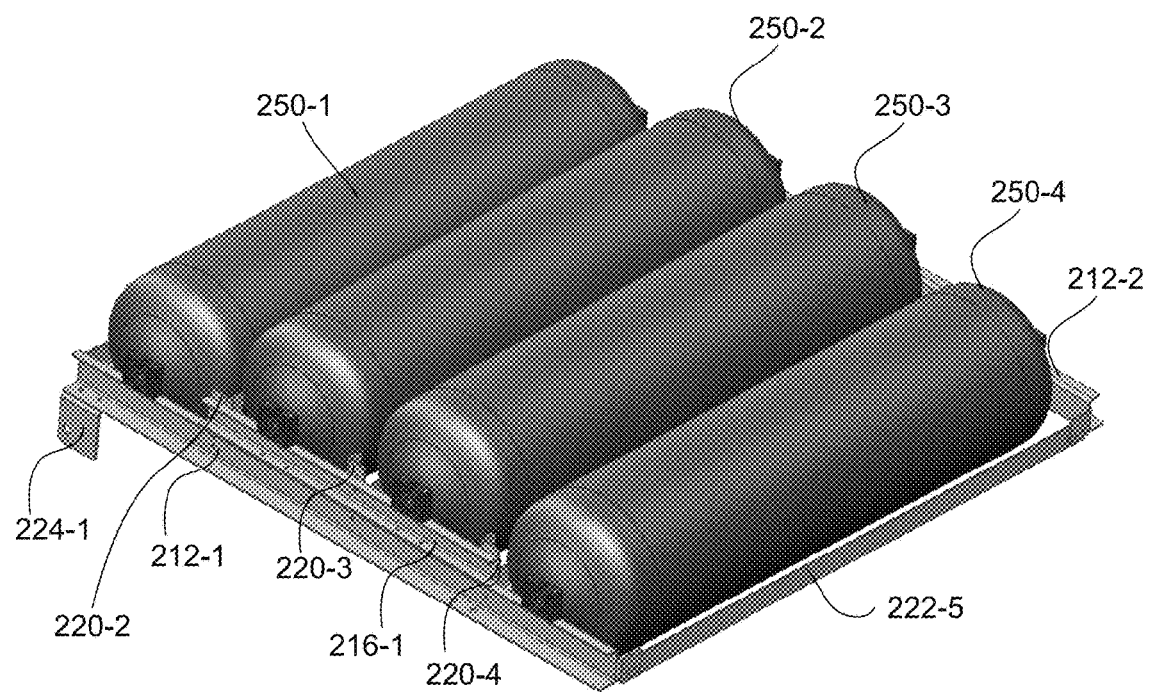
FIG. 2C is a top perspective view of the fuel storage system of FIG. 2A.
Figure 2D:
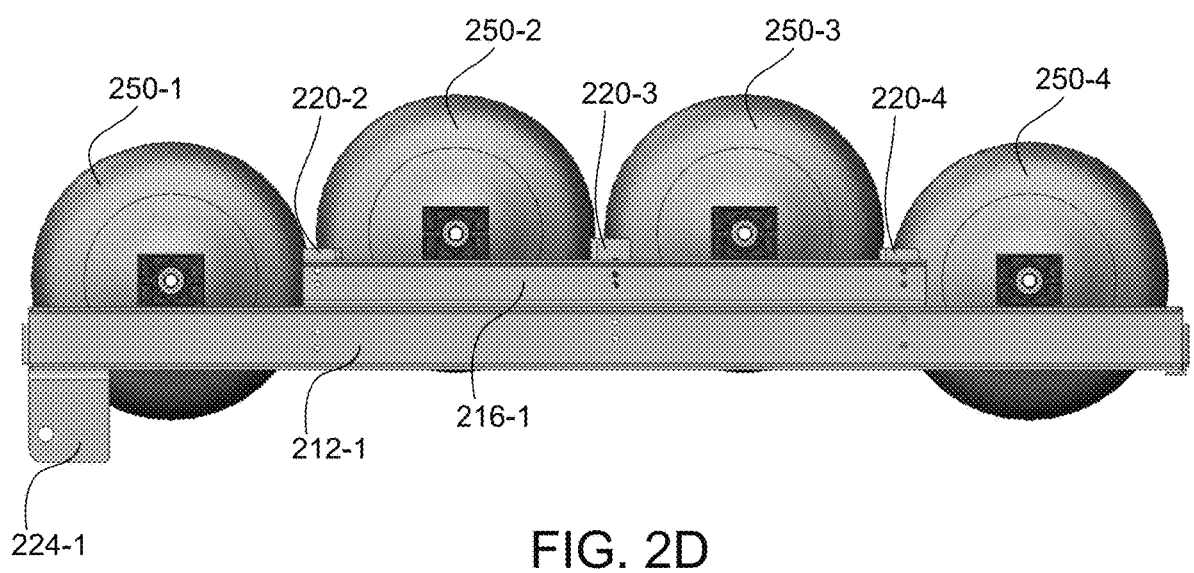
FIG. 2D is a side view of the fuel storage system of FIG. 2A.

FIGS. 2C and 2D respectively show a top perspective view and a side view of the fuel storage system of FIG. 2A. The fuel containers 250 are configured to be received in the respective regions 223 defined by the end support members 212/216 and side support members 222. As previously described, the neck portions of the fuel containers 250 are supported by the neck support brackets 228, and the longitudinal side portions of the fuel containers are supported by the side support members 222. Accordingly, each fuel container is rigidly held within the support assembly in at least two locations (top and side of container). In some embodiments, the bottom sides of the fuel containers (opposite to the neck portions) may also be affixed or in contact with the support assembly, so as to enhance the rigidity with which the fuel containers are supported by the support assembly.

The fuel storage system described herein, such as the arrangement of the fuel containers 250 by the support assembly 211, can be configured to accommodate tailgates of different shapes and designs, for example as illustrated in FIGS. 2E-2I. This eliminates the need for custom-built support assemblies which can be costly and/or difficult to assemble and disassemble. The fuel storage system can also be configured such that the fuel containers and/or support assembly are positioned to match the shape or contour of the tailgate.

Figure 2E:
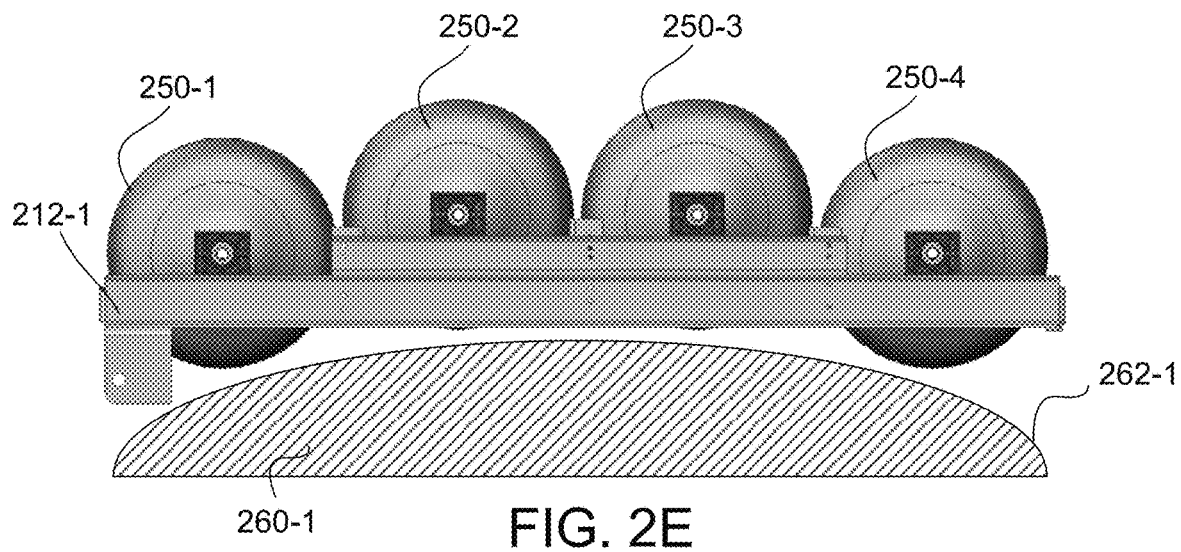
FIG. 2E is a side view of the fuel storage system of FIG. 2A coupled to a rounded tailgate, in accordance with an embodiment.

FIG. 2E is a side view of the fuel storage system of FIG. 2A coupled to a rounded tailgate 260-1, in accordance with an embodiment. An end portion of the tailgate 260-1 may have a rounded surface 262-1. The fuel storage system 210 can be configured to follow the contour of the tailgate 260-1. When the fuel storage system 210 is positioned on or coupled to the tailgate 260-1, the inner periphery portions of the fuel containers 250 and/or the support assembly 211 may substantially follow the contour of the rounded surface 262-1 of the tailgate 260-1, while minimizing contact and/or exerting a pressure load onto the tailgate, in some instances, even without contacting or exerting a pressure load at all.

Figure 2F:
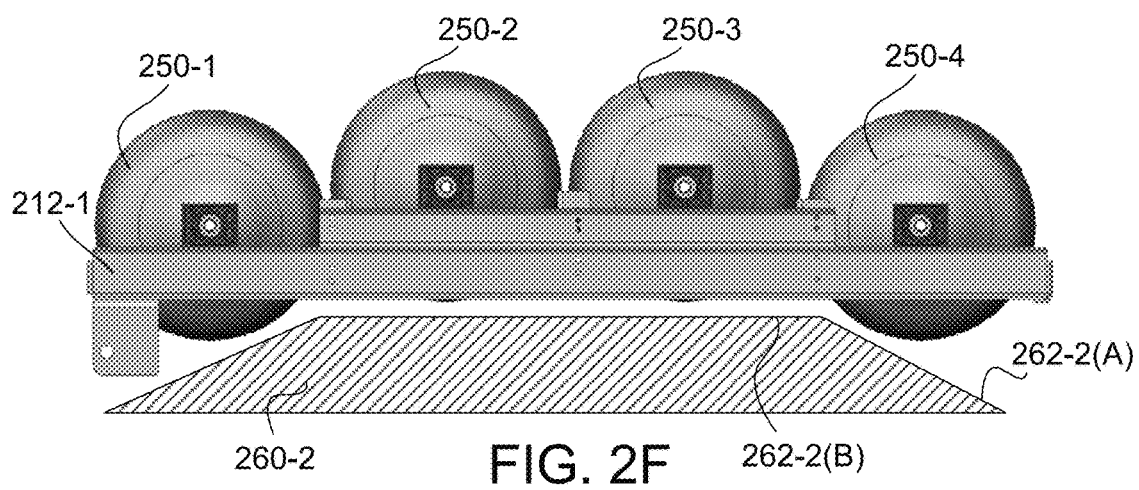
FIG. 2F is a side view of the fuel storage system of FIG. 2A coupled to a trapezoidal-shaped tailgate, in accordance with an embodiment.

FIG. 2F is a side view of the fuel storage system of FIG. 2A coupled to a trapezoidal-shaped tailgate 260-2, in accordance with an embodiment. An end portion of the tailgate 260-2 may have a trapezoidal-shaped surface 262-2. The fuel storage system 210 can be configured to follow the contour of the tailgate 260-2. When the fuel storage system 210 is positioned on or coupled to the tailgate 260-2, the inner periphery of the fuel containers 250 and/or the support assembly 211 may substantially follow the contour of the trapezoidal-shaped surface 262-2 of the tailgate 260-2, while minimizing contact and/or exerting a pressure load onto the tailgate, in some instances, even without contacting or exerting a pressure load at all. For example, the inner periphery of the first and fourth fuel containers 250-1 and 250-4 may be conform to the inclined portions 262-2(A) of the trapezoidal-shaped surface without contacting the inclined portions, whereas the inner periphery of the second and third fuel containers 250-2 and 250-3 may conform to a base portion 262-2(B) of the trapezoidal-shaped surface without contacting the base portion.

Figure 2G:
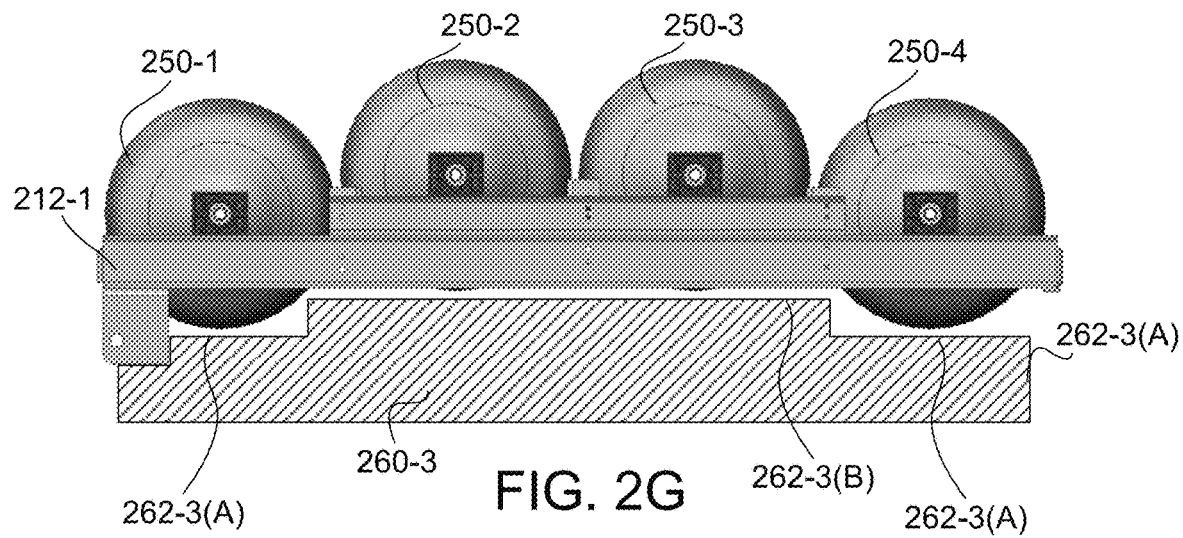
FIG. 2G is a side view of the fuel storage system of FIG. 2A coupled to a stepped tailgate, in accordance with an embodiment.

FIG. 2G is a side view of the fuel storage system of FIG. 2A coupled to a stepped tailgate 260-3, in accordance with an embodiment. An end portion of the tailgate 260-3 may have a protrusion 262-3. The fuel storage system 210 can be configured to follow the contour of the tailgate 260-3. When the fuel storage system 210 is positioned on or coupled to the tailgate 260-3, the inner periphery of the fuel containers 250 and/or the support assembly 211 may substantially follow the contour of the tailgate 260-3, while minimizing contact and/or exerting a pressure load onto the tailgate, in some instances, even without contacting or exerting a pressure load at all. For example, the inner periphery of the first and fourth fuel containers 250-1 and 250-4 may conform to the base portions 262-3(A) of the tailgate 260-3 without contacting the base portions, whereas the second and third fuel containers 250-2 and 250-3 may conform to a surface 262-3(B) of the protrusion without contacting the surface.

Figure 2H:
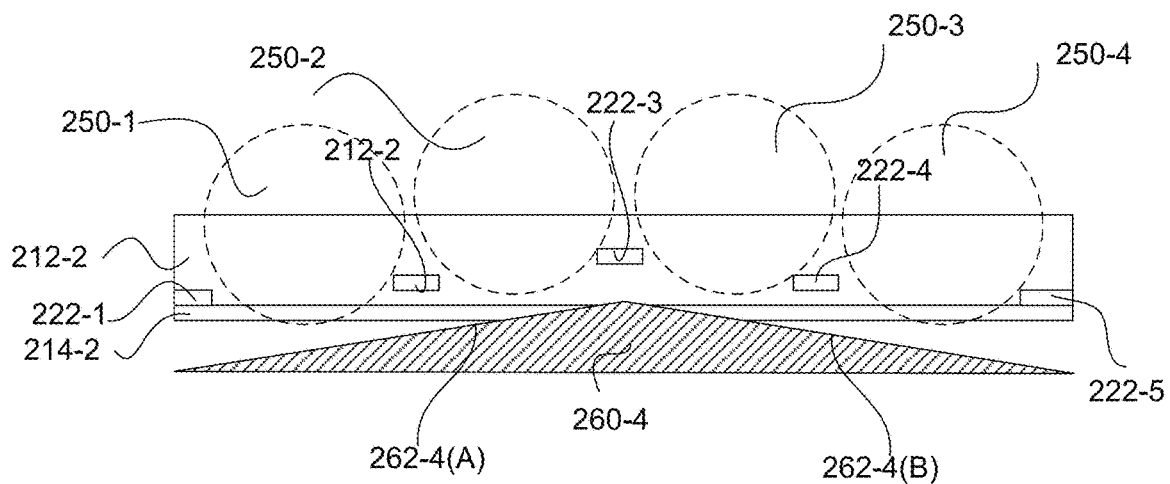
FIG. 2H is a side view of the fuel storage system of FIG. 2B coupled to a triangular-shaped tailgate, in accordance with an embodiment.

As previously described with reference to FIG. 2B, the side support members 222 of the support assembly and the fuel containers disposed thereon may be provided in a staggered layout. The staggered layout permits the fuel storage system to accommodate a variety of odd-shaped tailgates. For example, in FIGS. 2B and 2H, the first and fifth side support members 222-1 and 222-5 are located on a first plane located on or near to the bottom flanges 214 of the end support members 212-1 and 212-2. The second and fourth side support members 222-2 and 222-4 are located on a second plane located further away from the bottom flanges 214. The third side support member 222-3 is located on a third plane located furthest away from the bottom flanges 214. Accordingly, a "triangular-shaped" open space is formed, which allows a similar triangular-shaped tailgate to be accommodated therein. For example, FIG. 2H is a side view of the fuel storage system of FIG. 2B coupled to a triangular-shaped tailgate 260-4, in accordance with an embodiment. An end portion of the tailgate 260-4 may have a triangular-shaped surface 262-4. The fuel storage system 210 can be configured to follow the contour of the tailgate 260-4. When the fuel storage system is positioned on or coupled to the tailgate 260-4, the inner periphery of the fuel containers 250 and/or the support assembly 211 may substantially follow the contour of the triangular-shaped surface 262-4 of the tailgate, while minimizing contact and/or exerting a pressure load onto the tailgate, in some instances, even without contacting or exerting a pressure load at all. For example, the inner periphery of the first and second fuel containers 250-1 and 250-2 may conform to a first inclined portion 262-4(A) of the triangular-shaped surface without contacting the first inclined portion, whereas the third and fourth fuel containers 250-3 and 250-4 may conform to a second inclined portion 262-4(B) of the triangular-shaped surface without contacting the second inclined portion.

Figure 2I:
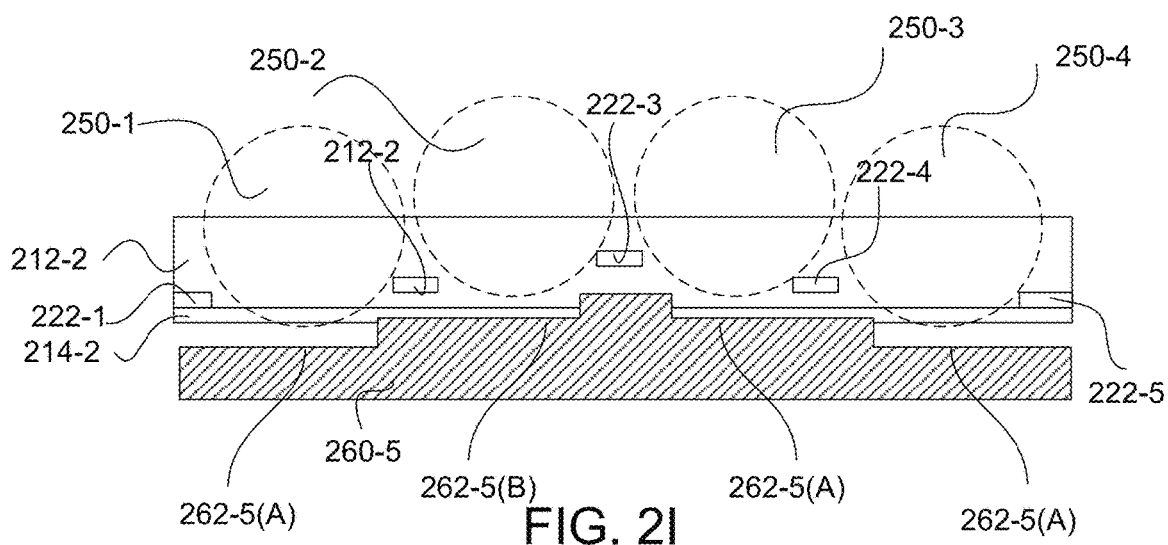
FIG. 2I is a side view of the fuel storage system of FIG. 2B coupled to a stepped tailgate, in accordance with an embodiment.

FIG. 2I is a side view of the fuel storage system of FIG. 2B coupled to a stepped tailgate 260-5, in accordance with an embodiment. An end portion of the tailgate 260-5 may have a plurality of protrusions extending in an outward manner. The fuel storage system 210 can be configured to follow the contour of the tailgate 260-5. When the fuel storage system is positioned on or coupled to the tailgate 260-5, the inner periphery of the fuel containers 250 and/or the support assembly 211 may substantially follow the contour of the tailgate 260-5, while minimizing contact and/or exerting a pressure load onto the tailgate, in some instances, even without contacting or exerting a pressure load at all. For example, the inner periphery of the first and fourth fuel containers 250-1 and 250-4 may conform to base portions 262-5(A) of the tailgate without contacting the base portions, whereas the second and third fuel containers 250-2 and 250-3 may conform to a surface 262-5(B) of a first protrusion without contacting the surface of the first protrusion. In some cases, a second protrusion may be located on the first protrusion, between the second and third fuel containers 250-2, 250-3. This allows the empty spaces between the fuel containers 250 and/or the support assembly to be maximized.

Figure 3A:
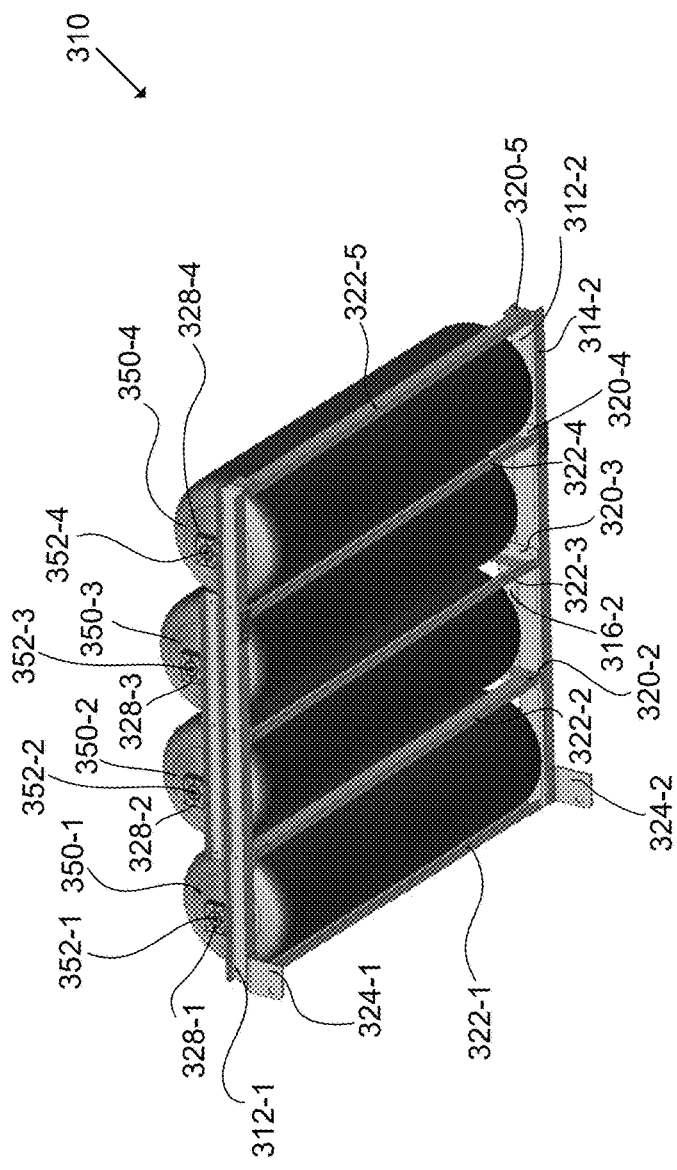
FIG. 3A is a bottom perspective view of a fuel storage system, in accordance with another embodiment.
Figure 3B:
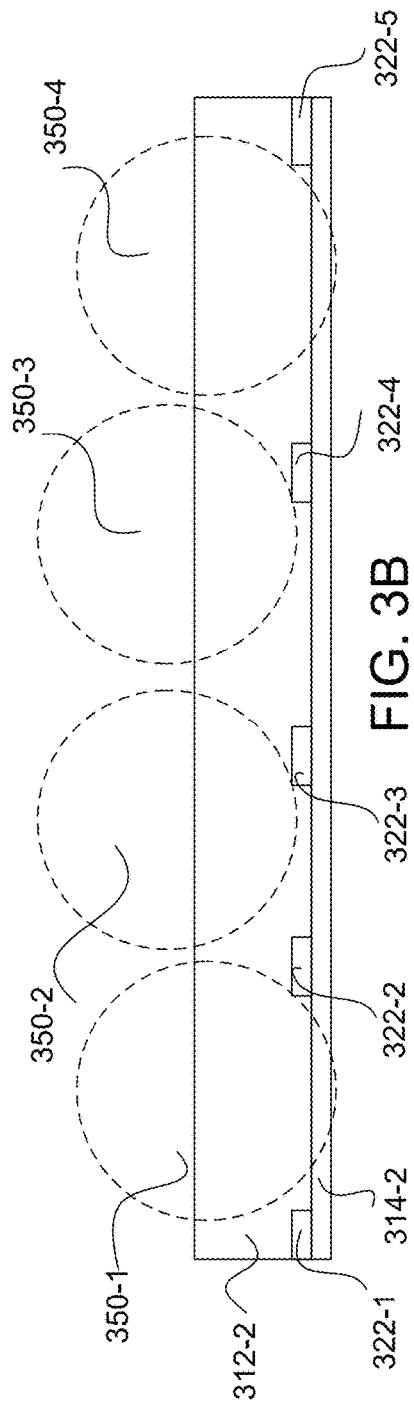
FIG. 3B is a side schematic view of the fuel storage system of FIG. 3A.
Figure 3C:
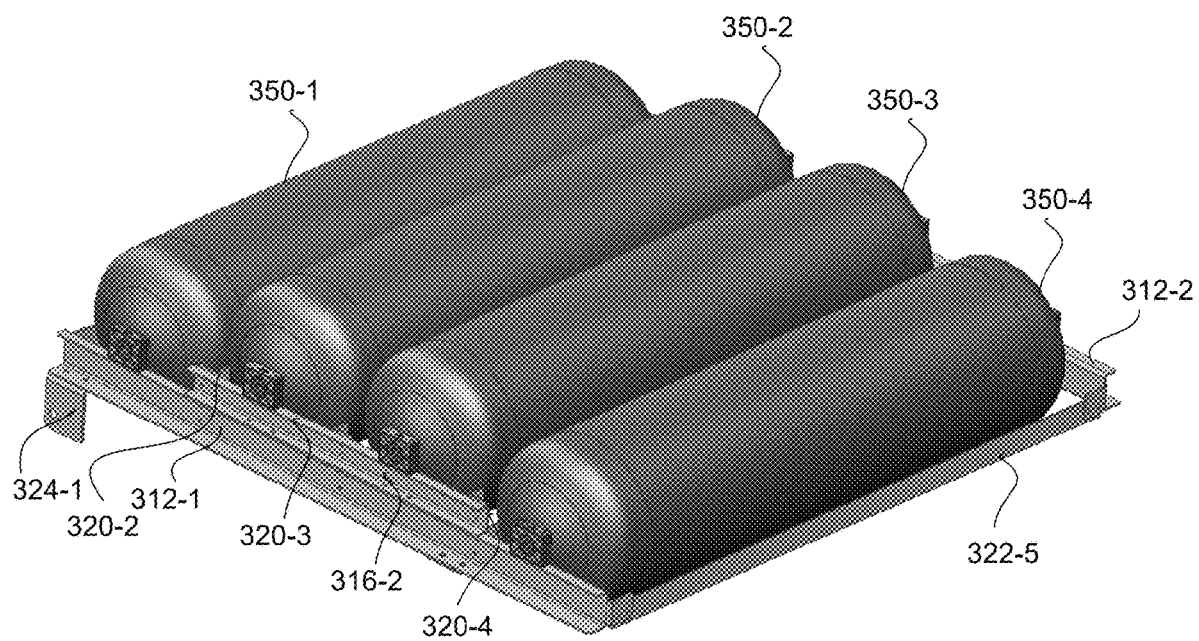
FIG. 3C is a top perspective view of the fuel storage system of FIG. 3A.
Figure 3D:
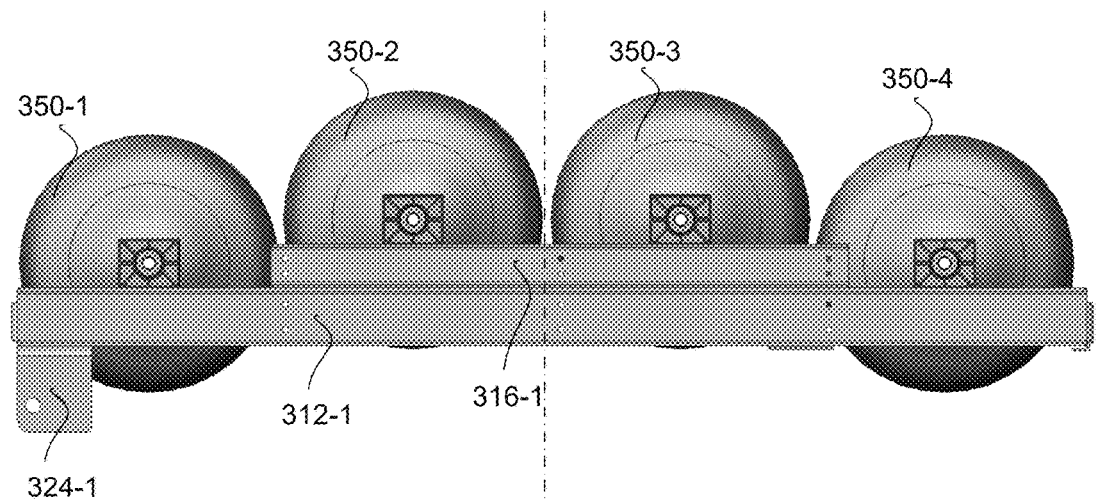
FIG. 3D is a side view of the fuel storage system of FIG. 3A.
Figure 3E:
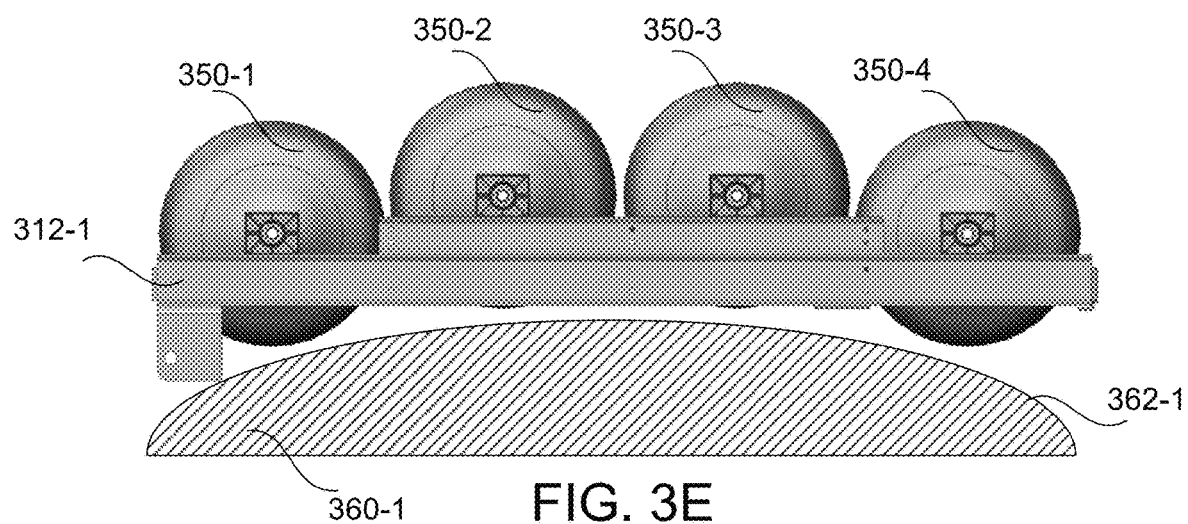
FIG. 3E is a side view of the fuel storage system of FIG. 3A coupled to a rounded tailgate, in accordance with another embodiment.
Figure 3F:
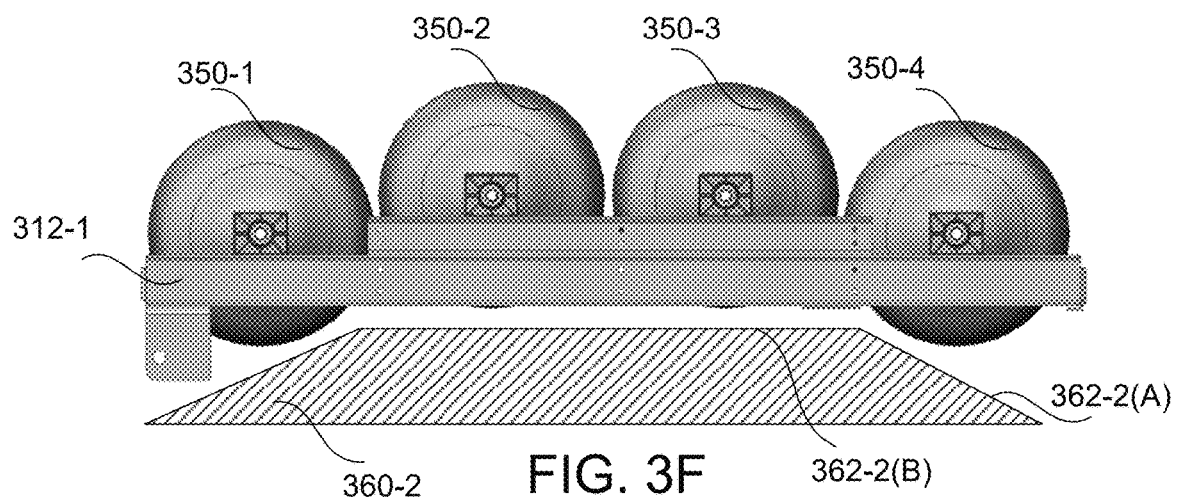
FIG. 3F is a side view of the fuel storage system of FIG. 3A coupled to a trapezoidal-shaped tailgate, in accordance with another embodiment.
Figure 3G:
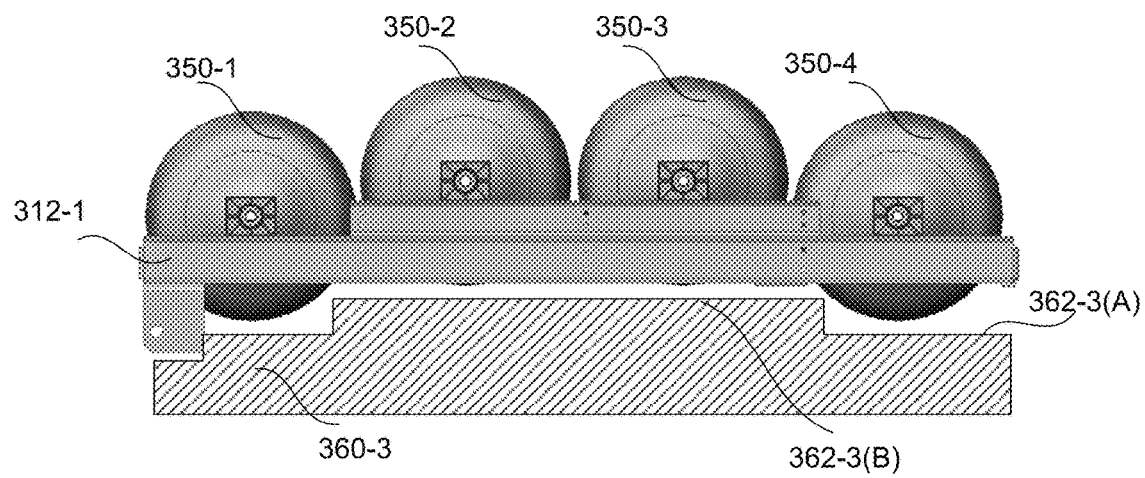
FIG. 3G is a side view of the fuel storage system of FIG. 3A coupled to a stepped tailgate, in accordance with another embodiment.
Figure 3H:
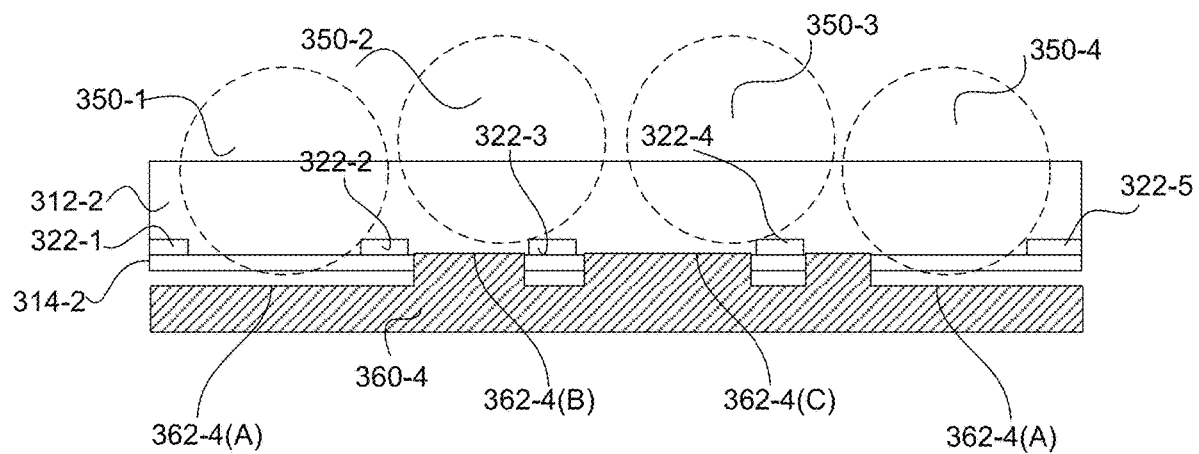
FIG. 3H is a side view of the fuel storage system of FIG. 3B coupled to a stepped tailgate, in accordance with another embodiment.

FIGS. 3A-3H illustrate a fuel storage system 310 in accordance with another embodiment. Specifically, FIG. 3A is a bottom perspective view of the fuel storage system 310, FIG. 3B is a side schematic view of the fuel storage system 310, FIG. 3C is a top perspective view of the fuel storage system 310, and FIG. 3D is a side view of the fuel storage system 310. FIG. 3E is a side view of the fuel storage system 310 coupled to a rounded tailgate, FIG. 3F is a side view of the fuel storage system coupled to a trapezoidal-shaped tailgate, FIG. 3G is a side view of the fuel storage system coupled to a stepped tailgate, and FIG. 3H is a side view of the fuel storage system coupled to a stepped tailgate. The embodiments of FIGS. 3A-3H are similar to those of FIGS. 2A-2I except for the following differences. Referring back to FIG. 2B, the side support members 222 are provided in a staggered layout within the support assembly 211, with a longitudinal difference (d1 or d2) between two or more of the side support members, such that the side support members are located on different planes. In contrast, referring to FIGS. 3A and 3B, the side support members 322 are provided on a same plane within the support assembly 311, and there is no longitudinal difference between two or more of the side support members. The fuel containers 350, however, continue to maintain a staggered configuration. For example, the first and fourth fuel containers 350-1 and 350-4 are located on a same plane, while the second and third fuel containers 350-2 and 350-3 are located on another different plane. The disposition of the fuel containers 350 on different planes permits the fuel storage system 310 to easily accommodate tailgates of various shapes/designs/sizes, as described elsewhere herein.

Referring to FIG. 3D, the fuel storage system may include a plurality of end support members of varying lengths. In some embodiments, the end support members 312 may be longer than the auxiliary end support members 316. For example, the end support members 312 may be at least 10%, 20%, 30%, 40%, 50%, 60%, 70%, 80%, or 90% longer than the auxiliary end support members 316. In some cases, the end support members 312 may be at least twice as long as the auxiliary end support members 316. A plurality of end support members can be stacked in a pyramid or step-like configuration. For example, a first set of auxiliary end support members may be stacked on top of a set of base end support members; a second set of auxiliary end support members may be stacked on top of the first set of auxiliary end support members; a third set of auxiliary end support members may be stacked on top of the second set of auxiliary end support members, and so forth. At least some of the base end support members, and/or the first through third sets of auxiliary end support members, may have varying lengths. For example, in some embodiments, the first set of auxiliary end support members may be shorter than the set of base end support members; the second set of auxiliary end support members may be shorter than the first set of auxiliary end support members; the third set of auxiliary end support members may be shorter than the second set of auxiliary end support members, and so forth. Accordingly, the end support members can be stacked in a pyramid or step-like configuration to support a plurality of fuel containers in a staggered configuration. The fuel storage system may be a multi-layer support system comprising of a stack of end support members. The plurality of end support members can be stacked as centered layers or off-centered layers. For example, an auxiliary end support member 316 may be centered on top of an underlying end support member 312, such that the fuel containers are symmetrically centered with respect to the dotted line shown in FIG. 3D. Alternatively, an auxiliary end support member 316 may be off-centered relative to an underlying end support member 312, such that the fuel containers are not symmetrically centered with respect to the dotted line. An auxiliary end support member may be offset from the center of an underlying end support member by any distance or amount, for example by at least 10%, 20%, 30%, 40%, or 50% of a length of the auxiliary end support member. It should be appreciated that the foregoing description relating to the varying lengths of the end support members, and the stacked configuration of the end support members (e.g. pyramid or step-like stacked configuration), can apply to any of the embodiments described elsewhere herein. Various modifications can be made to any of the disclosed embodiments of the fuel storage system, that enable the system to support a plurality of fuel containers in various staggered configurations, and to accommodate tailgates having different shapes and/or sizes.

For example, referring to FIG. 3H, an end portion of a tailgate 360-4 may have a plurality of protrusions disposed longitudinally along the tailgate. The fuel storage system 310 can be configured to follow the contour of the tailgate 360-4. When the fuel storage system 310 is positioned on or coupled to the tailgate 360-4, the inner periphery of the fuel containers 350 and/or the support assembly 311 may be substantially follow the contour of the tailgate. For example, the inner periphery of the first and fourth fuel containers 350-1 and 350-4 may conform to base portions 362-4(A) of the tailgate without contacting the base portions, whereas the second and third fuel containers 350-2 and 350-3 may conform to surfaces 362-4(B) and 362-4(C) of a first protrusion and a second protrusion without contacting the aforementioned surfaces of the first and second protrusions. In some cases, the first and second protrusions may have different dimensions. Alternatively, the first and second protrusions may have the same dimensions. Any type of structural features (e.g., protrusions, cavities, recesses, jagged edges, etc.) may be contemplated for the tailgate.

Figure 4A:
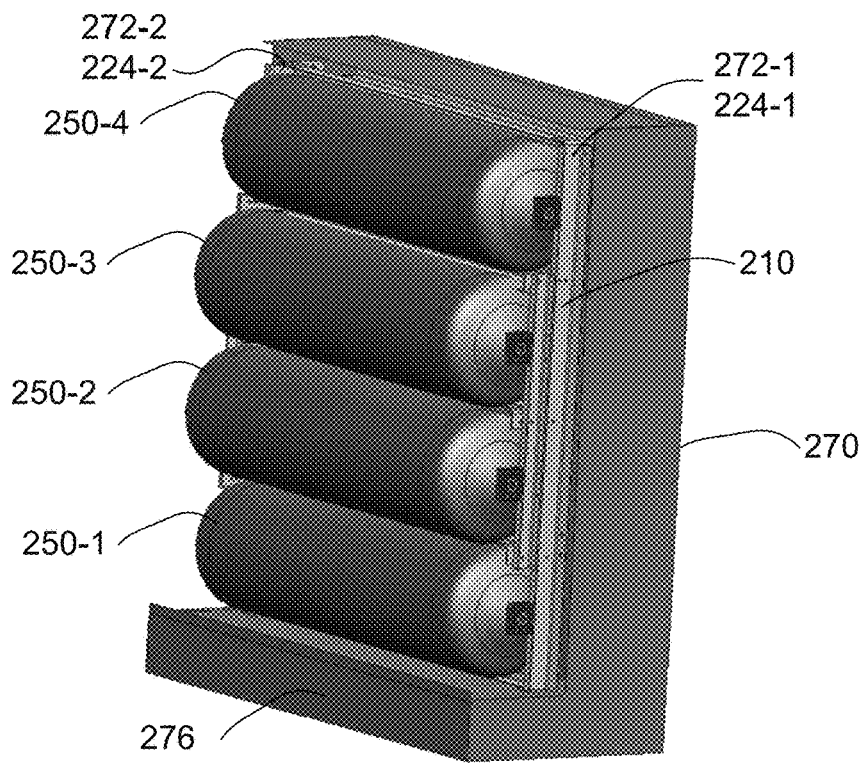
FIG. 4A is a perspective view of a fuel storage system mounted to a frame of a tailgate in an upright manner, in accordance with an embodiment.
Figure 4B:
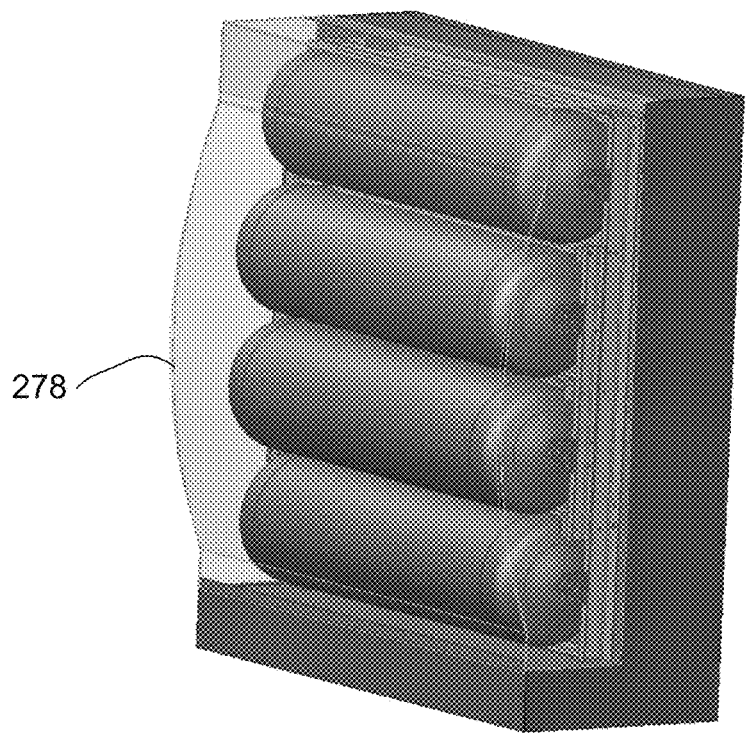
FIG. 4B is a perspective view of the fuel storage system of FIG. 4A being enclosed within a cover, in accordance with an embodiment.

FIG. 4A is a perspective view of a fuel storage system 210 mounted to a frame 270 of a tailgate in an upright manner, in accordance with an embodiment. The frame may include hinges 272-1 and 272-2 to which the first pivot bracket 224-1 and the second pivot bracket 224-2 of the support assembly 211 are respectively mounted. The support assembly may be configured to rotate about the hinges 272 between a closed position (preventing access to an interior of a container, e.g., container 104) and an open position (permitting access to the interior of the container, e.g., container 104). The frame 270 may also include a recess (not shown) for receiving and holding the support assembly 211. The frame 270 may further include a bumper 276 that extends out beyond the fuel containers 250, such that the fuel containers can be protected from impact to the rear of the vehicle. In some embodiments, a cover 278 can be attached to the frame 270, in order to protect and/or prevent unauthorized access to the fuel containers, as shown in FIG. 4B. The cover may be made of any material, e.g., metal, plastics, etc., and may be opaque, transparent, or translucent.

FIG. 5 is a perspective view of the fuel storage system of FIG. 4B attached and/or mounted to a vehicle. The vehicle may include a cab 102 and a container 104, as previously described in FIG. 1A. The fuel storage system and the tailgate may be disposed at the rear of the vehicle.

In various embodiments, the number and/or arrangement of the support assemblies and/or members thereof may be based on the characteristics of the environment where the fuel storage system is used such as the type and dimension of the cab of a vehicle. In an embodiment, such environment information is obtained and analyzed, for example, via a computerized modeling tool to determine a configuration (e.g., number, types and arrangement) of the support assemblies. In some embodiments, such determination may be aimed at optimizing the cost, space and/or other configurable considerations (e.g., shape/dimension/size of tailgate). According to the determined configuration, the support assemblies may be selected, assembled and/or arranged (e.g., connected) such as discussed above.

As discussed above, the fuel storage system may be mounted, for example, to a vehicle according to various configurations such as discussed in connection with FIG. 1. Alternatively, the fuel storage system may be used in a stand-alone fashion. As described above, in an embodiment, the support assembly may include a small number (e.g., four, six or eight) of modular members with a small number (e.g., two, three or four) of distinct shapes that are easy to manufacture, assemble, dissemble and/or reuse. In some embodiments, the modular members are also designed to be durable and lightweight.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the described embodiments will be apparent to a person skilled in the art. It is therefore contemplated that the invention shall also cover any such modifications, variations and equivalents.

What is claimed is:

1. A support assembly for supporting a stacked arrangement of fuel containers and coupling to a tailgate of a vehicle, comprising:
    a plurality of end support members configured to be oriented vertically when applied to the tailgate of the vehicle, the plurality of end support members comprising:
        a first elongate end support member having a forward facing side and a rearward facing side;
        a second elongate end support member having a forward facing side and a rearward facing side;
        the forward facing side of the second elongate end support member being directly coupled to the rearward facing side of the first elongate end support member,
        the second elongate end support member being shorter than the first elongate end support member such that an upper end of the second elongate end support member is disposed below an upper end of the first elongate end support member and a lower end of the second elongate end support member is disposed above a lower end of the first elongate end support member;
    a first fuel container supported by a first neck support bracket coupled to the rearward facing side of the first elongate end support member above the upper end of the second elongate end support member;
    a second fuel container supported by a second neck support bracket coupled to the rearward facing side of the second elongate end support member;
    a plurality of side support members that are coupled to the plurality of end support members, the plurality of side support members comprising a first side support member coupled to at least one of the first elongate end support member and the second elongate end support member and a second side support member coupled to at least one of the first elongate end support member and the second elongate end support member below the first side support member, the plurality of end support members and the plurality of side support members defining a rectangular frame structure;
    wherein central axes of the first and second fuel containers are located on different planes, the first side support member and the second side support member being disposed different distances from the forward facing side of the first elongate end support member in a manner that forms a recess in a middle portion of the support assembly adjacent one or more of the fuel containers, the recess being configured to accommodate a shape of the tailgate.

2. The support assembly of claim 1, wherein the plurality of side support members are located on different planes relative to the end support members.

3. The support assembly of claim 1, wherein the end support members include flanges, wherein the first side support member is located at a first distance from the flanges and the second side support member is located at a second distance from the flanges.

4. The support assembly of claim 2, wherein the different planes on which the central axes of the fuel containers are located are parallel to each other.

5. The support assembly of claim 1, wherein the shape of the tailgate is one or more of rounded, arcuate, trapezoidal, triangular, or stepped.

6. The support assembly of claim 1, wherein side portions of the fuel containers are supported by or in contact with the plurality of side support members.

7. The support assembly of claim 6, wherein the neck support brackets are configured to provide support for neck portions of the fuel containers, and the plurality of side support members are configured to protect body portions of the fuel containers.

8. The support assembly of claim 1, wherein at least one of the side support members is detachably coupled to either the first elongate end support member or the second elongate end support member.

9. The support assembly of claim 1, wherein the plurality of side support members are interchangeable with one another.

10. The support assembly of claim 1, wherein the plurality of end support members comprises a first pair of end support members and a second pair of end support members disposed on different planes from one another.

11. The support assembly of claim 10, wherein the first pair of end support members are configured to support a first set of fuel containers, wherein the second pair of end support members are configured to support a second set of fuel containers different from the first set, and wherein the first and second sets of fuel containers are disposed on different planes from one another.

12. The support assembly of claim 10, wherein the first and second pairs of end support members are parallel to one another.

13. The support assembly of claim 10, wherein the second pair of end support members are coupled to central portions of the first pair of end support members.

14. The support assembly of claim 1, wherein the fuel containers comprise containers for compressed natural gas (CNG).

15. The support assembly of claim 11, wherein the first set of fuel containers comprises central axes that are located on a first plane, and the second set of fuel containers comprises central axes that are located on a second plane different from the first plane.

16. The support assembly of claim 15, wherein the first plane and the second plane are offset from each other by a fixed distance or a variable distance, such that the first and second planes are oriented to permit the support assembly and the stacked arrangement of fuel containers to accommodate the shape of the tailgate.

17. The support assembly of claim 16, wherein the first plane and the second plane are parallel to each other.

18. The support assembly of claim 15, wherein a position and/or an orientation of at least one of the first or second planes is adjustable.

19. The support assembly of claim 18, wherein the position and/or orientation of at least one of the first or second planes is adjustable by moving one or more of the end support members or side support members.

20. A support assembly for supporting a stacked arrangement of fuel containers and coupling to a tailgate of a vehicle, comprising:
a plurality of end support members comprising a first end support member, a second end support member, a third end support member, and a fourth end support member, wherein the first end support member is directly coupled to the second end support member along the entire length of the second end support member, and the third end support member is coupled to the fourth end support member;
a plurality of side support members that are coupled to the plurality of end support members, the plurality of end support members and the plurality of side support members defining a rectangular frame that is oriented vertically when applied to the tailgate of the vehicle;
wherein the first and third end support members comprise rearward facing sides configured to support a first set of fuel containers and the second and fourth end support members comprise rearward facing sides configured to support a second set of fuel containers, the second set of fuel containers being disposed in a middle portion of the support assembly;
wherein the first set of fuel containers comprises central axes located on a first plane and the second set of fuel containers comprises central axes located on a second plane; and
wherein the first plane and the second plane are offset in a manner that forms a recess adjacent the second set of fuel containers that is configured to accommodate a shape of the tailgate.

21. The support assembly of claim 20, wherein one or more of the end support members is configured to be adjusted by a mechanical element, wherein the mechanical element is configured to provide direct connection along the entire length of the second end support member at different positions along the length of the first end support member to alter a configuration of the recess.

22. The support assembly of claim 21, wherein the mechanical element comprises one or more channels disposed in one or both of the first end support member and the second end support member.

23. The support assembly of claim 21, wherein the mechanical element comprises one or more grooves disposed in one or both of the first end support member and the second end support member.

* * * * *

UNITED STATES PATENT AND TRADEMARK OFFICE
CERTIFICATE OF CORRECTION

PATENT NO. : 10,864,859 B2  
APPLICATION NO. : 15/886773  
DATED : December 15, 2020  
INVENTOR(S) : Todd F. Sloan Page 1 of 1

It is certified that error appears in the above-identified patent and that said Letters Patent is hereby corrected as shown below:

In the Specification

Column 12, Line 55, delete "angle" and insert --angle ϕ--.

Signed and Sealed this  
Twenty-third Day of March, 2021

Drew Hirshfeld  
*Performing the Functions and Duties of the*  
*Under Secretary of Commerce for Intellectual Property and*  
*Director of the United States Patent and Trademark Office*